United States Patent
Corstorphine et al.

(10) Patent No.: US 10,689,547 B2
(45) Date of Patent: Jun. 23, 2020

(54) ADHESIVE COMPOSITIONS

(71) Applicant: Powdertech (Bicester) Limited, Bicester (GB)

(72) Inventors: Stuart Corstorphine, Bicester (GB); Jana Kolbe, Bremen (DE)

(73) Assignee: POWDERTECH (BICESTER) LIMITED, Bicester (GB)

( * ) Notice: Subject to any disclaimer, the term of this patent is extended or adjusted under 35 U.S.C. 154(b) by 138 days.

(21) Appl. No.: 15/570,698

(22) PCT Filed: Apr. 29, 2016

(86) PCT No.: PCT/GB2016/051247
§ 371 (c)(1),
(2) Date: Oct. 30, 2017

(87) PCT Pub. No.: WO2016/174469
PCT Pub. Date: Nov. 3, 2016

(65) Prior Publication Data
US 2018/0355214 A1    Dec. 13, 2018

(30) Foreign Application Priority Data

Apr. 30, 2015    (GB) .................................. 1507477.6

(51) Int. Cl.
*C09J 5/04*        (2006.01)
*C09J 163/00*      (2006.01)
(Continued)

(52) U.S. Cl.
CPC .............. *C09J 5/04* (2013.01); *C08G 59/223* (2013.01); *C08G 59/226* (2013.01); *C08G 59/24* (2013.01);
(Continued)

(58) Field of Classification Search
CPC .. C08G 59/223; C08G 59/4007; C08G 59/70; C08G 59/68; C08G 59/24; C08G 59/226;
(Continued)

(56) References Cited

U.S. PATENT DOCUMENTS

| 4,238,587 A | 12/1980 | Crivello |
| 6,613,437 B1 * | 9/2003 | Eckhardt ................ A61K 6/887 |
| | | 428/413 |
| 2008/0051553 A1 | 2/2008 | Furuta et al. |

FOREIGN PATENT DOCUMENTS

WO    WO-2010077606 A1 *  7/2010    ................ C08F 2/01

OTHER PUBLICATIONS

Crivello, "Redox Initiated Cationic Polymerization," Journal of Polymer Science: Part A: Polymer Chemistry, vol. 47, No. 7, Apr. 1, 2009, pp. 1825-1835.
(Continued)

*Primary Examiner* — David T Karst
(74) *Attorney, Agent, or Firm* — Shumaker & Sieffert, P.A.

(57) ABSTRACT

The present invention concerns a curable adhesive composition, wherein the composition is a two-component composition comprising: (A) an adhesive component comprising: (i) an aliphatic glycidyl ether; (ii) a cycloaliphatic epoxy and/or an aromatic glycidyl ether; and (iii) a silane reducing agent; and (B) a catalyst component comprising: (iv) a Group 9 or Group 10 noble metal catalyst, wherein the adhesive component (A) and/or the catalyst component (B) further comprises an initiator; articles coated by the composition or component compositions thereof; methods of bonding articles using the composition or component compositions thereof; and kits comprising the composition or component compositions thereof.

18 Claims, 8 Drawing Sheets

(51) Int. Cl.
  *C08G 59/68* (2006.01)
  *C08G 59/24* (2006.01)
  *C08G 59/22* (2006.01)
  *C08G 59/32* (2006.01)
  *C08G 65/10* (2006.01)
  *C08G 59/38* (2006.01)
  *C08L 63/00* (2006.01)
  *C08K 5/54* (2006.01)
  *C08G 59/40* (2006.01)
  *C08G 59/70* (2006.01)

(52) U.S. Cl.
  CPC ....... *C08G 59/245* (2013.01); *C08G 59/3218* (2013.01); *C08G 59/38* (2013.01); *C08G 59/4007* (2013.01); *C08G 59/68* (2013.01); *C08G 59/70* (2013.01); *C08G 65/105* (2013.01); *C08K 5/5403* (2013.01); *C08L 63/00* (2013.01); *C09J 163/00* (2013.01)

(58) Field of Classification Search
  CPC .............. C08G 59/245; C08G 59/3218; C08G 65/105; C08G 59/38; C09J 163/00; C09J 5/04; C08L 63/00; C08K 5/5403
  USPC ........................................................ 525/524
  See application file for complete search history.

(56) References Cited

OTHER PUBLICATIONS

Crivello, "Redox Initiated Cationic Polymerization: Reduction of Triarylsulfonium Salts by Silanes," Silicon, vol. 1, No. 2, Apr. 1, 2009, pp. 111-124.
Crivello, "Cationic Photopolymerization of Alkyl Glycidyl Ethers," Journal of Polymer Science: Part A: Polymer Chemistry, vol. 44, No. 9, May 1, 2006, pp. 3036-3052.
Crivello, "Redox Initiated Cationic Polymerization: The Unique Behavior of Alkyl Glycidyl Ethers," Journal of Polymer Science: Part A: Polymer Chemistry, vol. 49, No. 10, May 15, 2011, pp. 2147-2154.
International Search Report and Written Opinion of International Application No. PCT/GB2016/051247, dated Jul. 26, 2016, 9 pp.
International Preliminary Report on Patentability from International Application No. PCT/GB2016/051247, dated Oct. 31, 2017, 6 pp.

\* cited by examiner

ADHESIVE COMPOSITIONS

The present invention relates to adhesive compositions. In particular, though not exclusively, it concerns curable adhesive compositions, precursor component compositions thereof, articles at least partially coated by such compositions, and methods of bonding articles together by employing and curing such compositions.

Adhesive bonding technologies are a substitute for joining processes, such as welding or riveting, which offer vehicle designers with the potential to select from a wider range of lightweight materials for vehicle design and construction. The ability to use lightweight materials allows vehicles to maximise fuel efficiency. Using adhesive bonding also enables the designers to join dissimilar materials in a given structure, and greatly simplifies the manufacturing process.

Current adhesive bonding methods require specific adhesive compositions, mainly single component compositions, and are limited by an energy intensive oven cure process. Furthermore, oven curing has the potential to damage (e.g. warp) structures composed of dissimilar materials, by means of differential thermal expansion and/or contraction. Thus, for the attainment of low energy manufacturing and lightweight construction, novel bonding technologies that result in lighter, higher performance and more efficient vehicles, with lower cost of manufacture, are desired.

Prior art adhesive compositions have faced difficulties in providing a combination of desirable properties, such as appropriate cure times and bond strengths. For example, US 2008/0051553 discloses single component thermally curable adhesive compositions comprising an epoxy resin monomer and a catalyst having the structure $Pd(Q)_2$, wherein Q is at least one ligand selected from the group consisting of a carboxylate, a halide, a ketoester, an ester, a ketone, an hydroxyl, and combinations thereof. However, such single epoxy component systems often do not provide a good balance of strength and curability, particularly in the joining of dissimilar materials.

In addition, Crivello (*J. Polymer Science*: Part A: Polymer Chemistry, Vol 47, 1825-1835 (2009)) describes a redox-initiated cationic polymerisation process, wherein the redox couple consists of a diaryliodonium salt that is dissolved in a monomer (either an aliphatic, cycloaliphatic or aromatic epoxy, an aliphatic oxetane, or a vinyl ether) and a noble metal catalyst. A silane reducing agent is also introduced into the reaction mixture, specifically in the vapour state. However, this study does not address variability in monomeric component combinations, with a view to assessing the effectiveness of the compositions in industrially applicable situations. Furthermore, such polymerisation processes usually require thermal initiation.

As such, there is a need for epoxy resin compositions with improved properties in terms of cure rate, bond strength, processibility, and ease of introduction into industrial bonding applications and processes.

Accordingly, the inventors have assessed a range of composition parameters and discovered a curable two-component adhesive composition. Thus, in a first aspect of the invention, there is provided a curable adhesive composition, wherein the composition is a two-component composition comprising:
(A) an adhesive component comprising:
 (i) an aliphatic glycidyl ether;
 (ii) a cycloaliphatic epoxy and/or an aromatic glycidyl ether; and
 (iii) a silane reducing agent; and
(B) a catalyst component comprising:
 (iv) a Group 9 or Group 10 noble metal catalyst,
wherein the adhesive component (A) and/or the catalyst component (B) further comprises an initiator.

Such compositions have surprisingly been found to provide an advantageous balance of properties in terms of bond strength and rate of cure. In particular, compositions according to the invention have been shown to result in a cured bond of excellent strength, and in a relatively rapid rate of cure.

Indeed, curing has been demonstrated to occur as soon as the catalyst component (B) is brought into contact with the adhesive component (A), i.e. the adhesive composition may be described as a 'contact cure' composition. This means that mixing of the adhesive component (A) and the catalyst component (B) is not necessarily required for curing to take place, since curing preferably occurs at an interface where (A) and (B) come into contact. It is believed that the curable adhesive composition of the present invention cures via a contact cure mechanism, which relies on a frontal polymerisation reaction to occur where the heat of reaction propagates (like a wave) through the bulk of the adhesive.

Although no heat is required for curing of the composition to occur, the curing process can be accelerated by the application of heat. This simplifies the manufacturing process and leads to an overall reduction in energy and waste streams (e.g. lower carbon footprint), i.e. even with heating, there are significant energy savings compared to currently available thermal cure adhesive compositions.

The combination of (i) an aliphatic glycidyl ether and (ii) a cycloaliphatic epoxy and/or an aromatic glycidyl ether in the adhesive component composition (A) has surprisingly been found to impart an optimum balance in terms of strength and curing properties. While the aliphatic glycidyl ether provides improvements in the rate of curing (i.e. faster curing), the cycloaliphatic epoxy and/or an aromatic glycidyl ether improves the strength of the cured adhesive, and thus the bond. These effects are even more pronounced in the case of a combination of an aliphatic glycidyl ether and an aromatic glycidyl ether, which therefore represents a preferred embodiment of the invention.

The term 'aliphatic', as used herein, refers to a linear or branched (i.e. not cyclic), saturated or unsaturated hydrocarbon group, wherein one or more methylene groups are optionally replaced with a heteroatom selected from oxygen, nitrogen and sulfur and/or a carbonyl group. For example, an aliphatic group includes a $C_{1-20}$ alkyl group, a $C_{2-20}$ alkenyl group, a $C_{1-20}$ alkoxyl group, a $C_{1-20}$ alkyl carbonyl group, and a $C_{1-20}$ alkenyl carbonyl group, polyethylene glycol groups, and polypropylene glycol groups. Preferably, the aliphatic group is a $C_{1-10}$ alkyl group, $C_{1-10}$ alkyl carbonyl group, a polyethylene glycol group, or a polypropylene glycol group (preferably $C_{1-10}$ alkyl group). Such groups are optionally substituted by 1 to 6 halogen atoms at any substitutable position.

In the context of the aliphatic glycidyl ether of the present invention, the aliphatic group is attached at any substitutable position to one or more glycidyl ether groups, e.g. one, two, three, four, five, or six glycidyl ether groups. For example, in the case of a diglycidyl ether, the aliphatic group is attached to two glycidyl ether groups at any substitutable positions. The term 'glycidyl ether', as used herein, refers to a group of the formula: —O—CH$_2$-epoxide.

The term '$C_{x-y}$ alkyl' as used herein refers to a linear or branched saturated hydrocarbon group containing from x to y carbon atoms. For example, $C_{1-20}$ alkyl refers to a linear or branched saturated hydrocarbon group containing from 1 to 20 carbon atoms. Examples of $C_{1-20}$ alkyl groups include methyl, ethyl, n-propyl, isopropyl, n-butyl, isobutyl, sec-butyl, tert-butyl, n-pentyl, isopentyl, neopentyl, n-hexyl, isohexyl, n-heptyl, n-octyl, n-nonyl, n-decyl, n-undecyl, n-dodecyl, n-tridecyl, n-tetradecyl, n-pentadecyl, n-hexadecyl, n-heptadecyl, n-octadecyl, n-nonadecyl, and n-eicosyl.

The term '$C_{x\text{-}y}$ alkenyl' as used herein refers to a linear or branched hydrocarbon group containing one or more carbon-carbon double bonds and having from x to y carbon atoms. Examples of $C_{2\text{-}20}$ alkenyl groups include ethenyl, 1-propenyl, 2-propenyl, 2-methyl-1-propenyl, 1-butenyl, 2-butenyl, 3-butenyl, 3-methyl-2-butenyl, 1-pentenyl, 2-pentenyl, 3-pentenyl, 4-pentenyl, 4-methyl-3-pentenyl, 1-hexenyl, 3-hexenyl, and 5-hexenyl.

The term '$C_{x\text{-}y}$ alkoxyl', as used herein, refers to a $C_{x\text{-}y}$ alkyl group in which one or more methylene groups are replaced an oxygen atom, wherein $C_{x\text{-}y}$ alkyl is as defined herein. Examples of $C_{1\text{-}20}$ alkoxy groups include methoxy, ethoxy, propoxy, iso-propoxy, butoxy, tert-butoxy, pentoxy, hexoxy, and repeating ethylene and/or propylene glycol groups.

The term '$C_{1\text{-}20}$ alkyl carbonyl', as used herein, refers to a $C_{x\text{-}y}$ alkyl group in which one or more methylene groups are replaced with a carbonyl group, wherein $C_{x\text{-}y}$ alkyl is as defined herein. Examples of $C_{1\text{-}20}$ alkyl carbonyl groups include acetyl, propanoyl, butanoyl, hexanoyl, 1,6-hexanedione, and 1,3-propanedione.

The term '$C_{1\text{-}20}$ alkenyl carbonyl', as used herein, refers to a $C_{x\text{-}y}$ alkenyl group in which one or more methylene groups are replaced with a carbonyl group, wherein $C_{x\text{-}y}$ alkenyl is as defined herein. Examples of $C_{1\text{-}20}$ alkenyl carbonyl groups include propenoyl, butenoyl, and hexanoyl.

The term 'polyethylene glycol', as used herein, refers to a group of the formula: —$(CH_2CH_2O)_n$—, where n is an integer representing the length of the chain.

The term 'polypropylene glycol', as used herein, refers to a group of the formula: —$(CH_2CH_2(CH_3)O)_n$—, where n is an integer representing the length of the chain.

Specific aliphatic glycidyl ethers include 1,4-butanediol diglycidyl ether, 1,6-hexanediol diglycidyl ether, diethylene glycol diglycidyl ether, dipropylene glycol diglycidyl ether, neopentyl glycol diglycidyl ether, dibromoneopentyl glycol diglycidyl ether, triethyleneglycol diglycidyl ether, glycerintriglycidylether, pentaerythritol glycidyl ether, trimethylolpropane triglycidyl ether, polyglycerol-3-polyglycidyl ether, castor oil triglycidyl ether, polypropylene glycol diglycidyl ether, polyethylene glycol diglycidyl ether, sorbitol polyglycidylether, polybutadiene diglycidyl ether, lauryl glycidyl ether, allyl glycidyl ether, n-butyl glycidyl ether, di(2,3-epoxypropyl) ether, and isopropyl glycidyl ether.

In a preferred embodiment of the present invention, the aliphatic glycidyl ether is an aliphatic di- or tri-glycidyl ether, i.e. the aliphatic group is substituted at two or three substitutable positions, respectively, by glycidyl ether groups. For example, 1,4-butanediol diglycidyl ether, 1,6-hexanediol, or trimethylolpropane triglycidyl ether. Indeed, due to an appreciable improvement in cure rate, aliphatic diglycidyl ethers are particularly preferred.

The aliphatic diglycidyl ether may be characterised as a compound of the formula: epoxide-$CH_2$—O—R—O—$CH_2$-epoxide, where R is a $C_{1\text{-}20}$ alkylene, a $C_{2\text{-}20}$ alkenylene group, a $C_{1\text{-}20}$ alkoxylene group, and a group of the formula: —C(O)—$C_{1\text{-}18}$ alkylene-C(O)—.

The term '$C_{x\text{-}y}$ alkylene' as used herein refers to a divalent hydrocarbon group obtained by removing one hydrogen atom from '$C_{x\text{-}y}$ alkyl' above. Examples of $C_{1\text{-}20}$ alkylene groups include methylene, ethylene, propylene, isopropylene, butylene, pentylene, and hexylene.

The term '$C_{x\text{-}y}$ alkenylene' as used herein refers to a divalent hydrocarbon group obtained by removing one hydrogen atom from '$C_{x\text{-}y}$ alkenyl' above. Examples of $C_{2\text{-}20}$ alkenylene groups include methenylene, ethenylene, propenylene, isopropenylene, butenylene, pentenylene, and hexenylene.

The term '$C_{x\text{-}y}$ alkoxylene' as used herein refers to a divalent group obtained by removing one hydrogen atom from '$C_{x\text{-}y}$ alkoxyl' above.

Specific aliphatic diglycidyl ethers include 1,4-butanediol diglycidyl ether, 1,6-hexanediol diglycidyl ether, diethylene glycol diglycidyl ether, neopentyl glycol diglycidyl ether, triethyleneglycol diglycidyl ether, dibromoneopentyl glycol diglycidyl ether, dipropylene glycol diglycidyl ether, polypropylene glycol diglycidyl ether, and diethylene glycol diglycidyl ether. Preferably, the aliphatic diglycidyl ether is of the formula: epoxide-$CH_2$—O—R—O—$CH_2$-epoxide, where R is a $C_{1\text{-}10}$ alkylene group, such as 1,6-hexanediol diglycidyl ether.

The term 'cycloaliphatic', as used herein, refers to a linear or branched, saturated or unsaturated hydrocarbon group, which contains at least one cycloalkyl group, and wherein one or more methylene groups of the hydrocarbon group are optionally replaced with a heteroatom selected from oxygen, nitrogen and sulfur and/or a carbonyl group. The cycloaliphatic group does not contain any aromatic moieties. The cycloalkyl group may form part of the main chain of the hydrocarbon group, or may be a substituent of the main chain at any substitutable position. Such groups are optionally substituted by 1 to 6 halogen atoms at any substitutable position.

The term 'cycloalkyl', as used herein, refers to a saturated monocyclic hydrocarbon ring of 5 to 7 carbon atoms. Examples of 5- to 7-membered cycloalkyl groups include cyclopentyl, cyclohexyl, and cycloheptyl.

The cycloaliphatic epoxy comprises at least one epoxy group. This may be in the form of a terminal epoxy group, a glycidyl ether (e.g. —O—$CH_2$-epoxide), or an epoxide fused to a $C_{5\text{-}7}$ cycloalkyl group, preferably an epoxide fused to a $C_{5\text{-}7}$ cycloalkyl group.

Suitable cycloaliphatic epoxy resins include cyclohexanedimethanol diglycidyl ether, bis(3,4-epoxycyclohexylmethyl) adipate, bis(3 4-epoxy-6-methylcyclohexylmethyl) adipate, bis(2,3-epoxycyclopentyl) ether, 3,4-epoxycyclohexylmethyl 3,4-epoxycyclohexanecarboxylate, 1,4-cyclohexanedimethanol diglycidyl ether, diglycidyl 1,2-cyclohexanedicarboxylate, and cycloaliphatic epoxy resins obtained by the hydrogenation of aromatic BADGE epoxy resins.

Preferably, the cycloaliphatic epoxy comprises two $C_{5\text{-}6}$ cycloalkyl groups wherein each are independently fused to an epoxide, such as bis(3,4-epoxycyclohexylmethyl) adipate, bis(3 4-epoxy-6-methylcyclohexylmethyl) adipate, bis (2,3-epoxycyclopentyl) ether, or 3,4-epoxycyclohexylmethyl 3,4-epoxycyclohexanecarboxylate.

The term 'aromatic', as used herein to describe the 'aromatic glycidyl ether', refers to a hydrocarbon group comprising at least one aromatic, monocyclic or bicyclic, 6-10-membered hydrocarbon ring system (e.g. phenyl or biphenyl), wherein one or more methylene groups are optionally replaced with a heteroatom selected from oxygen, nitrogen and sulfur and/or a carbonyl group. The aromatic ring system may form part of the main chain of the hydrocarbon group, or may be a substituent of the main chain at any substitutable position. Such groups are optionally substituted by 1 to 6 halogen atoms at any substitutable position.

Suitable aromatic glycidyl ethers include Novalac epoxy resins (including resourcinol modified phenol and bisphenol A/F modified phenol Novalac resins), BADGE epoxy resins, resourcinol diglycidylether, o-cresyl glycidyl ether, hydroquinone diglycidyl ether, phenyl glycidyl ether, diphenylol propane diglycidyl ether, p-tertiary butyl phenyl glycidyl ether, nonyl phenyl glycidyl ether, and bisphenol-based glycidyl ethers, such as bisphenol A diglycidyl ether and bisphenol F diglycidyl ether.

Preferably, the aromatic glycidyl ether is an aromatic di- or tri-glycidyl ether, i.e. the aromatic group contains two or three glycidyl ether groups, respectively. More preferably, the aromatic glycidyl ether is a diglycidyl ether. A particularly preferred selection of aromatic diglycidyl ether resins is presented in Table A.

TABLE A

| Resin | Base |
| --- | --- |
| D.E.R. 331 | Bisphenol-A |
| Polypox E375 | Bisphenol-F |
| Epilox A17-01 | Bisphenol-A; high purity |
| Epikote 862 | Bisphenol-F |
| Resoltech1050 | formaldehyde polymer and Bisphenol-A epoxy resin |

Of those identified in Table A, bisphenol A diglycidyl ether or bisphenol F diglycidyl ether resins are especially preferred, since these resins have been found to provide the composition of the invention with optimum strength properties.

The ratio of the aliphatic glycidyl ether and the cycloaliphatic epoxy and/or an aromatic glycidyl ether in the adhesive component composition may be from 10:1 to 1:10, 9:1 to 1:9, or 8:1 to 1:8, preferably 5:1 to 1:5, more preferably 2:1 to 1:2.

The amount of aliphatic glycidyl ether and cycloaliphatic epoxy and/or aromatic glycidyl ether in the adhesive component composition (A) may be 40 to 99% by weight of the adhesive component composition (A). Preferably, it is 50 to 95% by weight, more preferably 60 to 90% by weight.

The initiator for the polymerisation process, which facilitates curing of the adhesive composition of the present invention, may be present in either the adhesive component composition (A) and/or the catalyst component composition (B). For the polymerisation process to occur, at least one of (A) and (B) must contain an initiator. Surprisingly, it has been found that the room temperature storage stability of the adhesive component composition (A) is improved when the initiator is present in the catalyst component composition (B). However, under refrigeration conditions (i.e. approximately 10° C.), the adhesive component composition (A) is stable for over 6 months when the initiator is present therein. This property can be ameliorated for storage of the adhesive component composition (A) at room temperature by adding a filler (such as Genioperl P52 from Wacker or Ecka Aluminium MEP 027), such that the storage stability of (A) is comparable to when it is stored under refrigeration conditions.

Preferably, the initiator is present only in the adhesive component composition (A). Alternatively, it is preferable that the when the initiator is only present in the catalyst component composition (B), the composition is cured at a temperature of less than approximately 160° C. This is because it has been found that the bond strength is improved under these conditions.

The initiator is not particularly limited in the present invention and may be selected from an iodonium salt, a sulfonium salt, a phosphonium salt, an oxonium salt, an ammonium salt, a selenonium salt, a pyridinium salt, and combinations thereof.

Suitable iodonium salts include 4-octyloxyphenyl phenyl iodonium hexafluoroantimonate, diphenyliodonium tetrafluoroborate, diphenyliodonium hexafluorophosphate, diphenyliodonium hexafluoroantimonate, diphenyliodonium tetrakis(pentafluorophenyl(borate)), bis-(4-methylphenyl) iodonium hexafluorophosphate, bis-(4-methylphenyl) iodonium hexafluoroantimonate, bis-(4-methylphenyl) iodonium tetrakis(pentafluorophenyl)borate, bis-(4-methylphenyl) iodonium hexafluoroarsenate, phenyl-4-methylphenyliodonium hexafluorophosphate, phenyl-4-methylphenyliodonium hexafluoroantimonate, phenyl-4-methylphenyliodonium tetrakis(pentafluorophenyl)borate, phenyl-4-methoxyphenyliodonium hexafluoroantimonate, phenyl-4-methoxyphenyliodonium tetrakis(pentafluorophenyl)borate, phenyl-4-methoxyphenyliodonium tetrafluroborate, phenyl-3-nitrophenyliodonium hexafluorophenylantimonate, phenyl-3-nitrophenyliodonium tetrakis (pentafluorophenyl)borate, bis(4-tert-butylphenyl)iodonium hexafluoroantimonate, bis(4-tert-butylphenyl) iodonium tetrakis(pentafluorophenyl)borate, phenyl-4-diphenyliodonium hexafluoroantimonate, dinaphthyliodonium hexafluorophosphate, dinaphthyliodonium hexafluoroantimonate, dinaphthyliodonium tetrakis(pentafluorophenyl)borate, bis (4-dodecylphenyl)iodonium hexafluoroantimonate, bis(4-dodecylphenyl)iodonium tetrakis(pentafluorophenyl)borate, 4-methylphenyl-4-isopropylphenyliodonium hexafluoroantimonate, 4-methylphenyl-4-isopropylphenyliodonium tetrakis(pentafluorophenyl)borate, and diphenyliodonium decane ether hexafluoroantimonate, or combinations thereof.

Suitable sulfonium salts include triphenylsulfonium hexafluoroarsenate, triphenylsulfonium tetrafluoroborate, tri-p-methoxyphenyl-sulfonium hexafluoroarsenate, tri-p-methoxyphenyl-sulfonium tetrafluoroborate, (4-tert-butylphenyl)diphenyl-sulfonium triflate, (4-bromophenyl)-diphenylsulfonium triflate, (1-naphthyl)diphenyl-sulfonium triflate, diphenylsulfonium phenyldecane ether hexafluoroantimonate, and (4-tert-butoxycarbonyl-methoxy)-naphthyl diphenylsulfonium triflate, or combinations thereof.

Suitable phosphonium salts include tetraphenylphosphonium chloride, tetraphenylphosphonium iodide, tetraphenylphosphonium bromide, dimethyldiphenylphosphonium iodide, tetramethylphosphonium chloride, tetramethylphosphonium iodide, and tetramethylphosphonium bromide, or combinations thereof.

Suitable ammonium salts include bis-(triphenyl-phosphoranylidene) ammonium.

Suitable pyridinium salts include N-ethoxy-2-methylpyridinium hexafluorophosphate.

Suitable oxonium salts include triethyloxonium tetrafluoroborate, and oxonium ions that are formed by the combination of a Lewis acid such a boron trifluoride, a reactive cyclic ether such as an epoxide taken together with a proton donor, or combinations thereof.

Suitable selenonium salts include triphenylselenonium tetrafluoroborate, and triphenylselenonium hexafluoroantimonate, or combinations thereof.

Whilst a range of initiators are applicable for use in the composition of the invention, results have shown that iodonium salts are preferred, particularly diaryliodonium salts. Such initiators have surprisingly been found to exhibit greater reactivity at room temperature.

In a preferred embodiment, the iodonium salt is selected from (4-n-octyloxyphenyl)phenyliodonium hexafluoroantimonate (OPPI SbF$_6$), (4-n-decyloxyphenyl)phenyliodonium hexafluorophosphate (DOPI PF$_6$), di(t-butylphenyl)iodonium hexafluoroarsenate (DTBPI AsF$_6$), (4-methylphenyl)-(4-isopropylphenyl)iodonium tetrakis pentafluorophenylborate (Rhodorsil 2074), bis(dodecylphenyl) iodonium hexafluoroantimonate, (Deuteron 1242), and bis-(4-methylphenyl) iodonium hexafluorophosphate (Deuteron 2257).

A list of particularly preferred iodonium salts is presented in Table B.

TABLE B

| | | |
|---|---|---|
| Deuteron 1242 | (structure: bis(dodecylphenyl)iodonium cation with SbF₆⁻ anion) | Bis(dodecylphenyl) iodonium hexafluoroantimonate solved in C12/C14 glycidether |
| Deuteron 2257 | (structure: bis-(4-methylphenyl)iodonium cation with PF₆⁻ anion) | Bis-(4-methylphenyl) iodonium hexafluorophosphate solved in propylene carbonate |
| Rhodorsil 2074 | (structure: (p-isopropylphenyl)(p-methylphenyl)iodonium cation with tetrakis(pentafluorophenyl)borate anion) | (p-Isopropylphenyl)-(p-methylphenyl)-iodonium tetrakis-(pentafluorophenyl) borate solid |
| OPPI | (structure: p-(octyloxyphenyl)phenyliodonium cation with SbF₆⁻ anion) | p-(Octylphenyl)phenyl-iodonium hexafluoro-antimonate solid |

Especially preferred are (4-n-octyloxyphenyl)phenyliodonium hexafluoroantimonate (OPPI SbF$_6$) and (4-methylphenyl)-(4-isopropylphenyl)iodonium tetrakis pentafluorophenylborate (Rhodorsil 2074).

The initiator may be present in an amount of 0.01 to 1% by weight of the individual component (A) or (B), preferably 0.3 to 1% by weight or 0.05 to 0.75% by weight, even more preferably 0.1 to 0.5% by weight, most preferably 0.4% by weight. Preferably, the amount of initiator in the adhesive component composition (A) is less than 0.13% by weight in order to achieve a room temperature storage stability of over 6 months when the adhesive component composition (A) does not comprise a filler.

The silane of the adhesive component composition acts as a reducing agent in the redox-reaction of the initiation step of the polymerisation process. Suitable specific silane reducing agents include triethyl silane, phenyl silane, diphenyl silane, diphenylchlorosilane, trichlorosilane, tetraphenylsilane, tris(trimethylsilyl)silane, diphenylmethyl silane, polydimethyl siloxane, and n-octadecyl silane.

Preferably, the silane is selected from those presented in Table C.

TABLE C

| | | | |
|---|---|---|---|
| Triethylsilane | 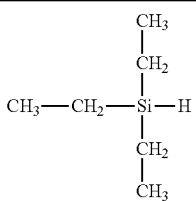 | | Liquid, Boiling point 107-108° C. Density 0.73 g/ml at 25° C. |
| Diphenylmethylsilane | 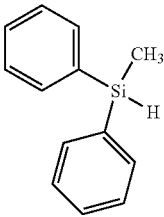 | | Liquid Boiling point 266-267° C. Density 0.9995 g/ml at 25° C. |
| Polydimethylsiloxane, hydride terminated | 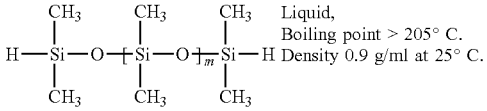 | | Liquid, Boiling point > 205° C. Density 0.9 g/ml at 25° C. |
| n-Octadecylsilane | 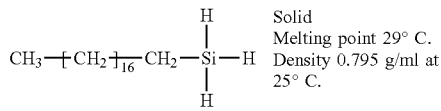 | | Solid Melting point 29° C. Density 0.795 g/ml at 25° C. |
| 1,1,3,3-Tetramethyldisiloxane | 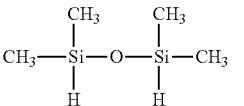 | | Liquid Boiling point 70-71° C. Density 0.76 g/ml at 25° C. very reactive according to literature [1] |

In a preferred embodiment, the silane reducing agent is of the formula: $(Ar)_2RSiH$, wherein Ar is an optionally substituted 6-10-membered aryl or heteroaryl group, and R is an optionally substituted $C_{1-6}$ alkyl group. Such silanes have been found to provide improved reactivity for curing at lower temperatures, e.g. below 100° C.

The term 'aryl', as used herein, refers to an aromatic, monocyclic or bicyclic, 6-10-membered hydrocarbon ring system. Examples of aryl groups include phenyl, naphthyl, tetrahydronaphthalenyl, anthryl, phenanthryl, acenaphthylenyl, biphenylyl, anthracenyl, phenanthrenyl, and phenalenyl.

The term 'heteroaryl', as used herein, refers to an aromatic, monocyclic or bicyclic, 6-10-membered ring system in which at least one of the rings is a 5- to 7-membered ring containing 1 to 4 heteroatoms selected from oxygen, nitrogen, and sulfur. In embodiments having a bicyclic ring system, one ring is a 5- to 7-membered ring containing 1 to 4 heteroatoms selected from oxygen, nitrogen, and sulphur, and the other ring may be a monocyclic aryl or monocyclic heteroaryl ring as defined herein. Examples of such monocyclic rings include thienyl, furyl, furazanyl, pyrrolyl, triazolyl, tetrazolyl, imidazolyl, oxazolyl, thiazolyl, oxadiazolyl, isothiazolyl, isoxazolyl, thiadiazolyl, pyranyl, pyrazolyl, pyrimidyl, pyridazinyl, pyrazinyl, pyridyl, triazinyl, and tetrazinyl. Examples of such bicyclic rings include quinolinyl, isoquinolinyl, indolyl, isoindolyl, benzofuryl, isobenzofuryl, quinazolinyl, benzoxazolyl, and benzimidazole.

The 6-10-membered aryl and heteroaryl groups, and the $C_{1-6}$ alkyl group, of the silane reducing agent are optionally substituted by 1 to 3 substituents at substitutable positions. Such optional substituents may be selected from halogen, nitrile (i.e. —CN), $C_{1-6}$ alkyl optionally substituted by 1 to 3 halogen atoms, and $C_{1-6}$ alkoxyl.

In a preferred embodiment, Ar is an optionally substituted phenyl group. It is also preferred that R is an optionally substituted methyl group. Thus, a particularly preferred silane reducing agent is diphenylmethylsilane.

The amount of silane reducing agent in the adhesive component composition (A) may be 0.1 to 5% by weight of the adhesive component composition (A). Preferably, it is 0.2 to 3% by weight, more preferably 0.5 to 2% by weight, even more preferably 1 to 2% by weight, most preferably 1.4% by weight.

The catalyst component comprises a Group 9 or Group 10 noble metal catalyst, i.e. a catalyst based on a Group 9 or Group 10 transition metal complex or salt. Although not particularly limited in the context of the polymerisation process of the invention, catalysts that are suitable for curing at low temperatures (i.e. below 100° C.) are preferred.

Suitable catalysts include Lamoreaux catalyst (a platinum octanol/octanal complex), Ossko catalyst (Pt(0)-CO—$(CH_2=CH(Me)SiO)_4$), Ashby-Karstedt catalyst (platinum divinyltetramethyldisiloxane), $Rh(cod)_2BF_4$, palladium(II) benzoate, palladium(II) acetylacetonate, palladium(II) chloride, palladium(II) acetate, palladium(II) isopropyl acetylacetonate, palladium(II) p-toluate, palladium(II) phenolate, palladium(II) fluoride, palladium(II) adipate, palladium(II)

pyruvate, palladium(II) stearate, palladium(II) citrate, palladium(II) formate, palladium(II) oleate, palladium(II) carbonate, palladium(II) naphthenoate, palladium(II) gluconate, palladium(II) ascorbate, palladium(II) binaptholate, Pt(cod)Cl$_2$, Pd(cod)Cl$_2$, dichloro(norbornadiene)platinum (II), palladium (II) chloride, palladium (II) bromide, palladium (II) iodide, bis(acetylacetonate)palladium (II), acetylacetonatocarbonyl rhodium, [1,3-Bis(2,6-diisopropylphenyl)imidazol-2-ylidene][1,3-divinyl-1,1,3,3-tetramethyldisiloxane]platinum(0) (Umicore HS425), and [1,3-Bis(cyclohexyl)imidazol-2-ylidene][1,3-divinyl-1,1,3,3-tetramethyldisiloxane]platinum(0) (Umicore HS432), or combinations thereof.

Due to a higher level of activity at room temperature, platinum and palladium catalysts are preferred in the present invention, particularly those having an oxidation state of 0 or 2 (preferably 2).

Preferably, the catalyst is selected from those presented in Table D.

A preferred catalyst structure is that of the formula: M(II)((X)$_2$(Y), wherein M is a metal selected from palladium and platinum, (II) represents the oxidation state of M, X is a monovalent ligand selected from halide, water, hydroxyl, cyanide, carbon monoxide, and ammonia, and Y is a bidentate ligand selected from a C$_{1-6}$ alkylenediamine (e.g. ethylenediamine), a C$_{1-6}$ alkyl 1,3-dicarbonyl anion (e.g. acetylacetonate), a 1,2-dicarbonyl anion (e.g. oxalate), a phenanthroline (e.g. phenanthroline), a bipyridyl (e.g. 2,2'-bipyridyl), and a cycloalkadienyl (e.g. 1,5-cyclooctadiene).

In this type of catalyst structure, X is preferably a halide, most preferably chloride. It is also preferable that Y is a cycloalkadienyl group, such as 1,5-cyclooctadiene. Thus, a particularly preferred catalyst is Pt(II)(cod)Cl$_2$.

The total metal content of the catalyst component composition (B) may be from 0.001% to 2.5% by weight of the catalyst component composition (B), preferably 0.005% to 1% by weight or 0.01% to 0.5% by weight, more preferably 0.05% to 0.35% by weight. Although the amount of catalyst

TABLE D

| Lamoreaux catalyst | 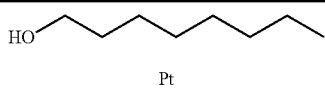 | Platinum-Octanal/Octanol-complex 2.0-2.5 wt % Platinum concentration in Octanol |
|---|---|---|
| Ossko catalyst | 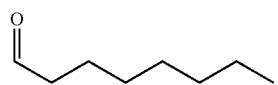 | Platinum carbonyl cyclomethylsiloxane comples 1.85-2.1 wt % platinum concentration in vinylmethylcyclic siloxanes |
| Platinum-Divinyltetramethyldisiloxane complex | 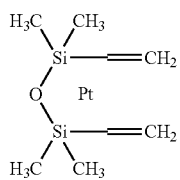 | 3-3.5 wt % platinum concentration in vinyl-terminated polydimethylsiloxane |
| Ashby-Karstedt catalyst | 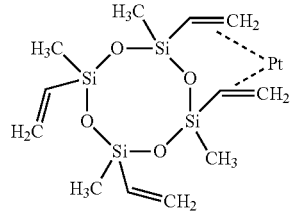 | 2-2.5 wt % platinum concentartion in cyclic methylvinylsiloxanes |
| Dichloro(1,5-cyclooctadiene)-platinum(II) | 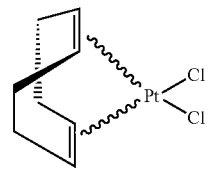 | Solid, 52 wt % platinum | used may be higher than this, results have shown that there is no advantage obtained with higher levels of catalyst.

For the purpose of providing the catalyst component (B) as an independent composition for curing with the adhesive component composition (A), the catalyst component (B) may further comprise a carrier selected from a solvent-based paint composition, a water-based paint composition, a VOC-free paint composition, a powder coat composition, an electro-coating composition, a polymeric film, a fibre-based film or resin, a thermoplastic polymer composition (e.g. one that is capable of being formed into an article by the application of heat and/or pressure during an injection moulding, extrusion, blow moulding, vacuum forming, calendaring, or lamination process), and a thermosetting polymer composition. Specific examples of thermoplastic polymers include polypropylene, polyamide, polyethylene, polyvinylchloride, polyester, EPDM (ethylene-propylene diene monomer), polycarbonate, ABS (acrylonitrile-butadiene-styrene), acrylic, ASA (acrylonitrile-styrene-acrylate), polyurethane, TPE, rubber, PEEK (polyetheretherketone), PEI (poly ether imide), and polyphenylenesulphide, or combinations thereof.

The type of carrier is not particularly limited provided that it does not hinder the polymerisation process. As long as the carrier provides a suitable dispersion of or surface for the catalyst, an effective catalyst component can be obtained. For processing reasons, a powder coating composition may be preferred (e.g. based on EPDXYPOL BT ULTRA, 30686, by Valspar, which is an epoxy polyester powder coating comprising approximately equal proportions of a carboxylic acid functional polyester and a BADGE epoxy resin).

Given that the catalyst component (B) functions in a contact cure system with the adhesive component (A), the catalyst has sufficient mobility to migrate/diffuse from (B) to (A) on contact, or at least some of the catalyst is present at an outer surface of the carrier. Optimum results can be obtained when there is a suitable amount of catalyst at the outer surface of the catalyst component (B), for reaction with the adhesive component (A).

In a particularly preferred embodiment, the catalyst component (B) further comprises a carrier which is a polymeric film. Thus, the catalyst component (B) may be contained within a polymeric film, such as a polyethylene film (particularly linear low density polyethylene). The film may be produced by mixing together the components of the composition and extruding the composition through a cast film line to the desired thickness of film. Preferably, the film has a thickness of 40-110 µm, more preferably 50-100 µm. The film can be attached to a substrate in a mould, for example by placing the film into an injection moulding tool and forming a plastic article onto the film to produce a ready-to-bond surface straight from the mould, placed into contact with the adhesive component composition (A), and cured to form a strong bond between two separate materials (e.g. two dissimilar materials, such as bonding polyolefin to aluminium).

The adhesive component composition (A) and/or the catalyst component composition (B) may further comprise a number of different additives, which can be employed to impart various properties on the curable adhesive composition. For example, such additives include adhesion promoters, viscosity modifiers (e.g. castor oil, glycerin, solvents), reinforcing fillers, wetting aids, thixotropes (e.g. BYK D410), defoamers (e.g. acetylenic diol), waxes/lubricants (e.g. PTFE, PE, HDPE, PP, PA, wax), pigments/dyes/colourants, and antioxidants/stabilisers.

Suitable adhesion promoters include silanes, siloxanes, titanates (i.e. inorganic compounds composed of titanium oxides), and polyglycerol diglycidyl ethers. A preferred group of adhesion promoters is presented in Tables E and F.

TABLE E

| Adhesion promoter | CAS | Structure |
|---|---|---|
| 2-(3,4-Epoxycyclohexyl)-ethylmethyldiethoxysilane | 14857-35-3 | |
| 2-(3,4-epoxycyclohexyl)-ethyltriethoxysilane | 10217-34-2 | |
| 3-Glycidoxypropyl-trimethylsilane | 2530-83-8 | |
| 3-[(Glycidyloxy)-propyl]-dimethylethoxysilane | 17963-04-1 | |

TABLE E-continued

| Adhesion promoter | CAS | Structure |
|---|---|---|
| 3-Mercaptopropyl-trimethoxysilane | 4420-74-0 | 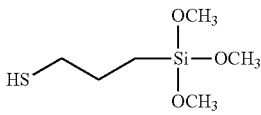 |
| Titanium (IV) butoxide | 5593-70-4 | 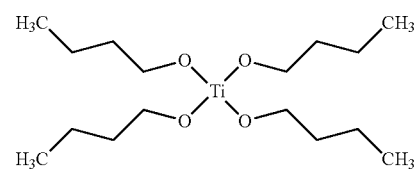 |

TABLE F

| Adhesion promoter | Supplier | Base |
|---|---|---|
| BYK-4510 | Byk-Chemie GmbH | Copolymer with hydroxy groups |
| BYK-4500 | | High molecular block copolymer |
| BYK-4511 | | Copolymer with functional groups |
| ADDID 900 | Evonik Industries AG | Different resins |
| Deolink Amino TE-100 | DOG Deutsche | 3-Aminopropyltriethoxysilan |
| Deolink Epoxy TM-100 | Oelfabrik | with [3-(2,3-Epoxypropoxy)propyl]tri-methoxysilane |
| Deolink EH 269 | | Mixture with [3-(2,3-Epoxypropoxy)propyl]tri-methoxysilane |
| WorlèeAdd 483 | Worlèe-Chemie GmbH | Polyester resin |
| OFS-6040 | Dow Corning GmbH | Vinylbenzylamino-ethylamino-propyltrimethoxysilane 40% in methanol |

It has been found that an improved lap shear bond strength can be obtained with a glycidyl ether siloxane, such as Deolink Epoxy TM-100. This effect was particularly prominent on articles composed of aluminium.

The adhesion promoter may be present in either the adhesive component composition (A) and/or the catalyst component composition (B) (preferably the adhesive component composition (A)), and is preferably present in an amount of 0.05% to 1% by weight of the individual components (A) or (B), more preferably 0.05% to 0.2%. Where present, the adhesion promoter is preferably included in the adhesive component composition (A).

The viscosity characteristics can be important for the application properties of the adhesive. The viscosity of the adhesive can be increased to improve handleability by the use of fillers. Suitably fillers include calcium carbonates, fumed silica, barium sulfate, aluminium trihydroxide, dolomite, silicon dioxide, talc, boron nitride, glass spheres, glass flakes, wollastonite, reinforcing fibres, nepheline syenite, polyamides, organoclays, and polyacrylates. The fillers Genioperl P52 and Ecka Aluminium MEP027 were found to be the most suitable, as they improved the viscosity of the composition and did not inhibit the cationic reaction on which the curing mechanism relies. Where present, the filler is preferably Genioperl P52 since it provides the best overall storage stability, and is preferably added to the adhesive component composition (A). The filler may be present in an amount of 1 to 50% by weight of the individual components (A) or (B), preferably 2 to 40% by weight or 2 to 30% by weight, more preferably 2 to 18% by weight. Levels of 2 to 8% by weight appear to be more optimal for plastic articles, whereas level of 12 to 18% by weight appear to be more optimal for metallic articles. Where present, the filler is preferably included in the adhesive component composition (A).

For improving the viscosity and flow characteristics of the adhesive component composition (A) in applications where the substrate to be bonded is placed in a non-horizontal orientation, fumed silica was found to be particularly beneficial. Specific versions of fumed silica for this purpose include Aerosil R8200 and Aerosil 104 (preferably Aerosil R8200). At levels of 2% by weight—8% by weight, preferably 4% by weight—6% by weight, more preferably 4.4% by weight—5.7% by weight of the adhesive component composition (A), the viscosity properties of the adhesive component composition (A) were found to be optimum in terms of preventing the flow of the composition off a substrate which was placed in a non-horizontal orientation (e.g. vertical orientation).

The adhesive composition also needs to have good wetting characteristics so that it is able to cover the substrate completely and maximise the bond area. These characteristics may be improved by the use of a wetting aid. Suitable wetting aids include those presented in Table G.

TABLE G

| Wetting agent | Supplier | Base |
|---|---|---|
| FC44-30 | 3M Deutschland GmbH | Fluorosurfactant |
| Tivida FL 2300 | Merck KGaA | Fluorosurfactant |
| Tego WET 270 | Evonik Industries AG | Polyethersiloxy-Copolymer |
| Tego WET 500 | | Non-ionic organic surfactant |

Preferably, the wetting is FC44-30 or Tego WET 270, since both have been shown to lower the surface tension of the composition from 43 mN/m to 30 mN/m, without affecting the viscosity. Where present, the wetting aid is preferably added to the adhesive component composition (A). The wetting aid may be present in an amount of from 0.01 to 1% by weight of the individual component (A) or (B), preferably 0.05 to 0.5% by weight, more preferably 0.075 to 0.2% by weight. Where present, the wetting aid is preferably included in the adhesive component composition (A).

In a second aspect of the invention, there is provided a method of curing the curable adhesive composition according to the first aspect, the method comprising bringing the adhesive component (A) into contact with the catalyst component (B).

Once the catalyst component (B) is brought into contact with the adhesive component (A), the polymerisation process (i.e. curing process) begins and a strong bonded composition is formed. Although curing can be conducted at room temperature, the process may be accelerated by the application of heat. For example, the curable adhesive composition may be heated at a temperature of up to 180° C., preferably room temperature to 150° C., more preferably 40 to 120° C., even more preferably 50 to 100° C.

Such heating of the curable adhesive composition may be conducted for any period of time sufficient for ensuring that a strong bond is produced. Preferably, the curable adhesive composition is heated for a period of time of up to 120 minutes, more preferably up to 90 mins or 60 mins, even more preferably from 30 to 50 mins.

As will be appreciated by one skilled in the art, any of the preferred embodiments of the other aspects of the invention also apply to the second aspect of the invention.

In a third aspect of the invention, there is provided a cured composition obtained by the method of the second aspect. The resulting bonded composition is a polymeric material formed by the polymerisation of an aliphatic glycidyl ether and a cycloaliphatic epoxy and/or an aromatic glycidyl ether, as described above.

As will be appreciated by one skilled in the art, any of the preferred embodiments of the other aspects of the invention also apply to the third aspect of the invention.

In a fourth aspect of the invention, there is provided an adhesive component composition comprising:
  (i) an aliphatic glycidyl ether;
  (ii) a cycloaliphatic epoxy and/or an aromatic glycidyl ether; and
  (iii) a silane reducing agent.

The adhesive component composition may further comprise an initiator.

As will be appreciated by one skilled in the art, any of the preferred embodiments of the other aspects of the invention also apply to the fourth aspect of the invention.

In a fifth aspect of the invention, there is provided an article at least partially coated by at least one layer of the curable adhesive composition according to the first aspect, or the adhesive component composition according to the fourth aspect.

The at least partial coat of the curable adhesive composition according to the first aspect, or the adhesive component composition according to the fourth aspect, is such that a given surface area of the article has been applied with an outer coating thereof. This area may correspond with the area designated for bonding with another article, or may be the entire article surface. For commercial reasons, the article will be coated only in a specific area where bonding is to occur.

The thickness of the adhesive layer may be in the region of 20 to 1000 μm, preferably 50 to 800 μm or 75 to 500 μm, even more preferably 100 to 200 μm.

As will be appreciated by one skilled in the art, any of the preferred embodiments of the other aspects of the invention also apply to the fifth aspect of the invention.

In a sixth aspect of the invention, there is provided an article at least partially coated by at least one layer of a catalyst component composition comprising a Group 9 or Group 10 noble metal catalyst, and a carrier, wherein the carrier is selected from a solvent-based paint composition, a water-based paint composition, a VOC-free paint composition, a powder coat composition, an electro-coating composition, a polymeric film, a fibre-based film or resin, a thermoplastic polymer composition (e.g. one that is capable of being formed into an article by the application of heat and/or pressure during an injection moulding, extrusion, blow moulding, vacuum forming, calendaring, or lamination process), and a thermosetting polymer composition (preferably a powder coat composition comprising a thermosetting epoxy polyester resin). The catalyst component composition may further comprise an initiator. The catalyst may be uniformly dispersed in the carrier or provided at an outer surface of the carrier.

The at least partial coat of the catalyst component composition is such that a given area of the article has been applied with an outer coating thereof. This area may correspond with the area designated for bonding with another article (e.g. an article coated with the adhesive component composition), or may be the entire article. Preferably, the article will be coated only in a specific area where bonding is to occur.

Depending on the application, the thickness of the catalyst component layer may be in the region of 10 to 1000 μm, preferably 10 to 200 μm, more preferably 15 to 150 μm; or 20 to 1000 μm, preferably 50 to 800 μm or 75 to 500 μm, even more preferably 100 to 200 μm.

As will be appreciated by one skilled in the art, any of the preferred embodiments of the other aspects of the invention also apply to the sixth aspect of the invention.

The article which is coated by any of the above-mentioned compositions is not limited in terms of technology sector, since bonding compositions may have a plethora of applications. For example, the article may be any physical item which is employed in the automotive, electronics, aerospace, construction, architectural, consumer appliance (e.g. white goods), agricultural, oil and gas, energy generation, healthcare, and telecommunications industries, or industry in general. In particular, the article may be a part (i.e. any physical or structural element) for an automotive vehicle, aviation vehicle or aircraft, military vehicle, agricultural vehicle, construction or demolition vehicle, or marine vessel. Such an article may be composed of a material selected from aluminium, zinc, copper, tin, titanium, steel, magnesium, wood, a rubber, paper, a plastic (e.g. a polymer masterbatch), a plastic composite, a fabric, and a carbon fibre composite. Preferably, the material is selected from aluminium, zinc, copper, tin, titanium, steel, magnesium, a plastic, a plastic composite, and a carbon fibre composite.

In a seventh aspect of the invention, there are provided methods of bonding two articles together. Accordingly, in a first embodiment, the method comprises the steps of:
  (1) providing an article at least partially coated by at least one layer of the adhesive component composition according to the fourth aspect of the invention,
  (2) providing an article at least partially coated by at least one layer of a catalyst component composition comprising a Group 9 or Group 10 noble metal catalyst, and
  (3) bringing the articles provided by steps (1) and (2) together in a region to be bonded in which each article is coated by its respective coating(s),
wherein the adhesive component composition of step (1) and/or the catalyst component composition of step (2) comprises an initiator.

Alternatively, the method of bonding the at least two articles together comprises the steps of:
  (1) providing an article at least partially coated by at least one layer of the adhesive component composition according to the fourth aspect of the invention,
  (2) applying the coated area provided by step (1) with at least a partial coating of at least one layer of a catalyst component composition comprising a Group 9 or Group 10 noble metal catalyst, and (3) bringing the article provided by steps (1) and (2) together with a further article in a region to be bonded, wherein the adhesive component composition of step (1) and/or the catalyst component composition of step (2) comprises an initiator.

In a further alternative, the method of bonding the at least two articles together comprises the steps of:

(1) providing an article at least partially coated by at least one layer of a catalyst component composition comprising a Group 9 or Group 10 noble metal catalyst, (2) applying the coated area provided by step (1) with at least a partial coating of at least one layer of the adhesive component composition according to the fourth aspect of the invention, and (3) bringing the article provided by steps (1) and (2) together with a further article in a region to be bonded, wherein the adhesive component composition of step (1) and/or the catalyst component composition of step (2) comprises an initiator.

Although bonding begins to occur on contact between the adhesive component and catalyst component compositions, it may be accelerated by the application of heat. Thus, the method may be made more time-efficient when it further comprises the step of: heating the region to be bonded at a temperature of up to 180° C. Preferably, lower temperatures than this are employed, such as up to 150° C., 140° C., 130° C., 120° C., 110° C., or 100° C. Even more preferably, the temperature may be 40 to 120° C., or 50 to 100° C.

Such heating of the region to be bonded may be conducted for any period of time sufficient for ensuring that a strong bond is produced. Preferably, the region to be bonded is heated for a period of time of up to 120 minutes, more preferably up to 90 mins or 60 mins, even more preferably from 30 to 50 mins. Most preferably, curing of the adhesive composition occurs within 45 minutes of contact.

Preferably, the method of this aspect of the invention is such that bonding between the articles occurs when one article is at least partially coated with the adhesive component composition and the other article is at least partially coated with the catalyst component composition (provided that at least one of these compositions comprises an initiator). Bonding occurs in the region of contact between the articles.

Surprisingly, it has also been found that the cured bond may be further improved (e.g. strengthened) by applying the catalyst component composition to both articles to be bonded, although the catalyst itself may be present in only one of the compositions applied to the articles, e.g. one article may be coated by the catalyst component composition and comprises catalyst and the other article may coated by the catalyst component composition but does not comprise catalyst (i.e. it comprises carrier). The adhesive component composition may then be applied to one of the articles, as an outer coating to the catalyst component composition.

For example, the adhesive component composition (A) may be provided as an outer coating (e.g. layer) on an inner, adjacent layer of the catalyst component composition (B). In this embodiment, where the catalyst component composition (B) also comprises a carrier, the inner, catalyst component layer may or may not comprise catalyst. Thus, the first article may comprise a first (i.e. inner) partial coating of the catalyst component composition (B) (with or without catalyst) and a second (i.e. outer), partial coating of the adhesive component composition (A), and the second article may comprise a partial layer of the catalyst component composition (B) (with or without catalyst), provided that at least one of the catalyst component compositions comprises catalyst. This type of arrangement is particularly effective for articles having a textured surface, such as carbon fibre composites.

Accordingly, the articles to be bonded may be composed of the same or different materials, and each material may be independently selected from aluminium, zinc, copper, tin, titanium, steel, magnesium, wood, a rubber, paper, a plastic, a plastic composite, a fabric, and a carbon fibre composite. As described above, the compositions of the invention, in conjunction with the method of the invention, are applicable for bonding a number of different materials, and are especially useful in joining dissimilar materials, since bonding occurs under mild conditions and therefore reduces the possibility of thermal stresses (e.g. warping) due to differential thermal expansion and/or contraction.

In an eighth aspect of the invention, there is provided a kit comprising:

(A) an adhesive component composition according to the fourth aspect of the invention, and (B) a catalyst component composition comprising a Group 9 or Group 10 noble metal catalyst, and optionally an initiator if the adhesive component composition (A) does not comprise an initiator.

As will be appreciated by one skilled in the art, any of the preferred embodiments of the other aspects of the invention also apply to the eighth aspect of the invention.

The invention will now be described in more detail by way of example only and with reference to the following figures.

FIG. 1 shows the individual reactivity of an aliphatic glycidyl epoxy (A), a cycloaliphatic epoxy (B), and an aromatic glycidyl epoxy (based on Bisphenol A; C). The results show that the aliphatic glycidyl epoxy is reactive at room temperature, the cycloaliphatic epoxy is reactive at temperatures between 100 and 200° C., and the aromatic glycidyl epoxy has a medium level of reactivity between 200 and 250° C.

FIG. 2 shows the reactivity of certain mixtures of an aliphatic glycidyl epoxy (1,6-hexandiol-diglycidether) and an aromatic glycidyl epoxy (based on Bisphenol A). The results show that mixtures of these components (A-C) also react at temperatures below 100° C., whereas the aromatic glycidyl epoxy alone (D) requires much higher temperatures for curing.

FIG. 3 shows the influence of the amount of catalyst on the reaction rate for a mixture of an aliphatic glycidyl epoxy (1,6-hexandiol-diglycidether) and an aromatic glycidyl epoxy (based on Bisphenol A-epichlorohydrin). The results show that a contact cure is possible with this mixture. Furthermore, the rate of reaction increases as the amount of catalyst on the contact surface is increased.

FIG. 4 shows the reactivity of the adhesive formulations according to Table 2, as measured by differential scanning calorimetry (DSC) measurements. The results show that each composition has an optimum reactivity at below 100° C. for curing.

FIG. 5 shows a dynamic mechanical thermal analysis (DMTA) trace showing the network development of the adhesive formulations according to Table 2, by monitoring the increase in elastic modulus (G') with time. The results suggest that each formulation provides a comparable bond, but that formulations comprising an aliphatic glycidyl ether (i.e. 1,6-hexane diglycidyl ether), a further aliphatic glycidyl ether, and an aromatic glycidyl ether (i.e. bisphenol-A-epichlorohydrin resin) have a slightly longer induction time.

FIG. 6 shows the results of a T peel test on the adhesive formulation of Example 4. Powder coated panels were prepared and cured at various temperatures: 100° C., 120° C., 140° C., 160° C. and 180° C. for both textured (NW36/2; left-hand bar) and smooth (NW35/2; right-hand bar) surfaces. The results show that the bond strength is improved when the powder coated catalyst component is first cured to the substrate panel at higher temperatures, i.e. 140 to 160° C.

EXAMPLES

Example 1—Improved Lap Shear Strength

Figure 1:
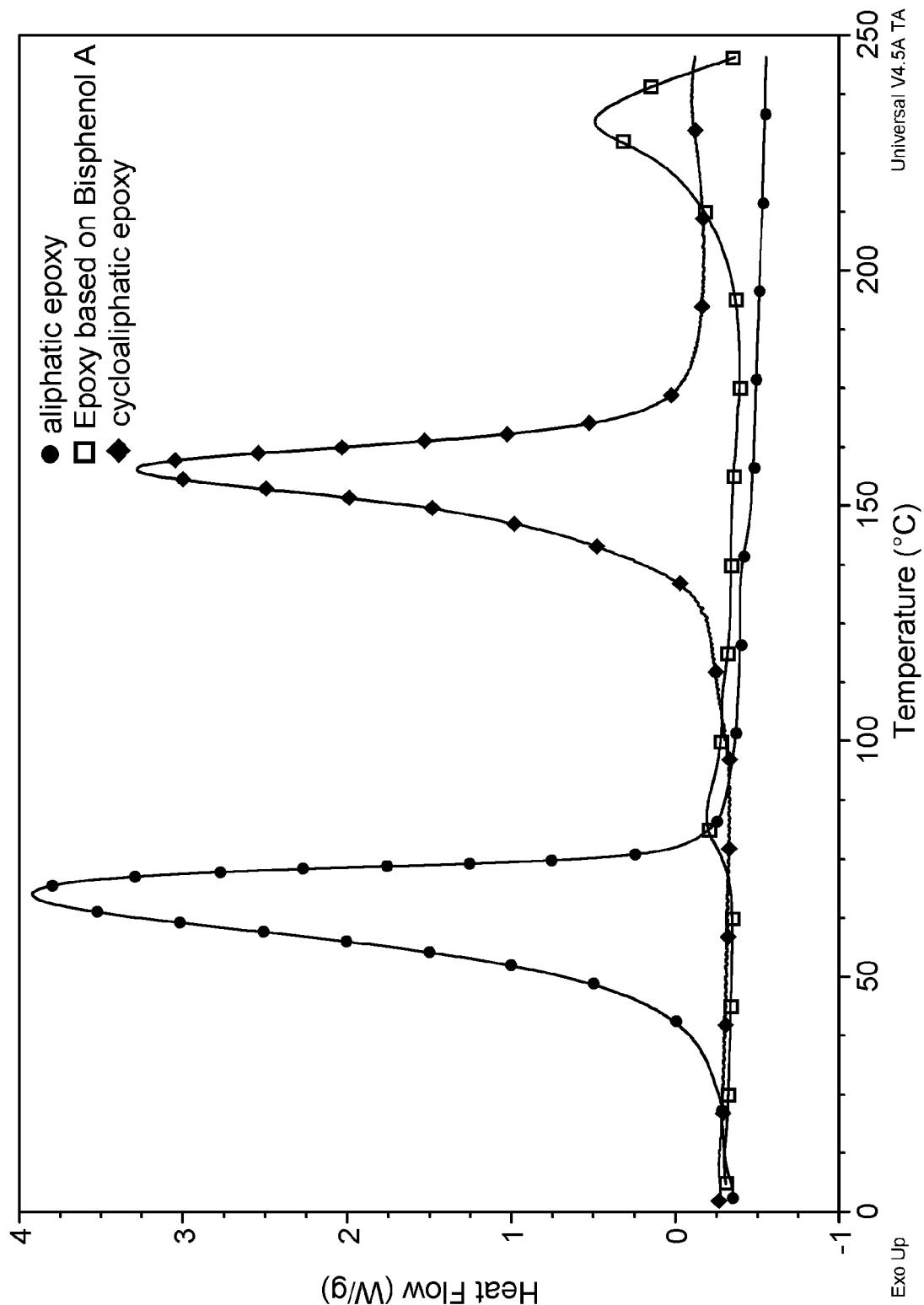
Figure 2:
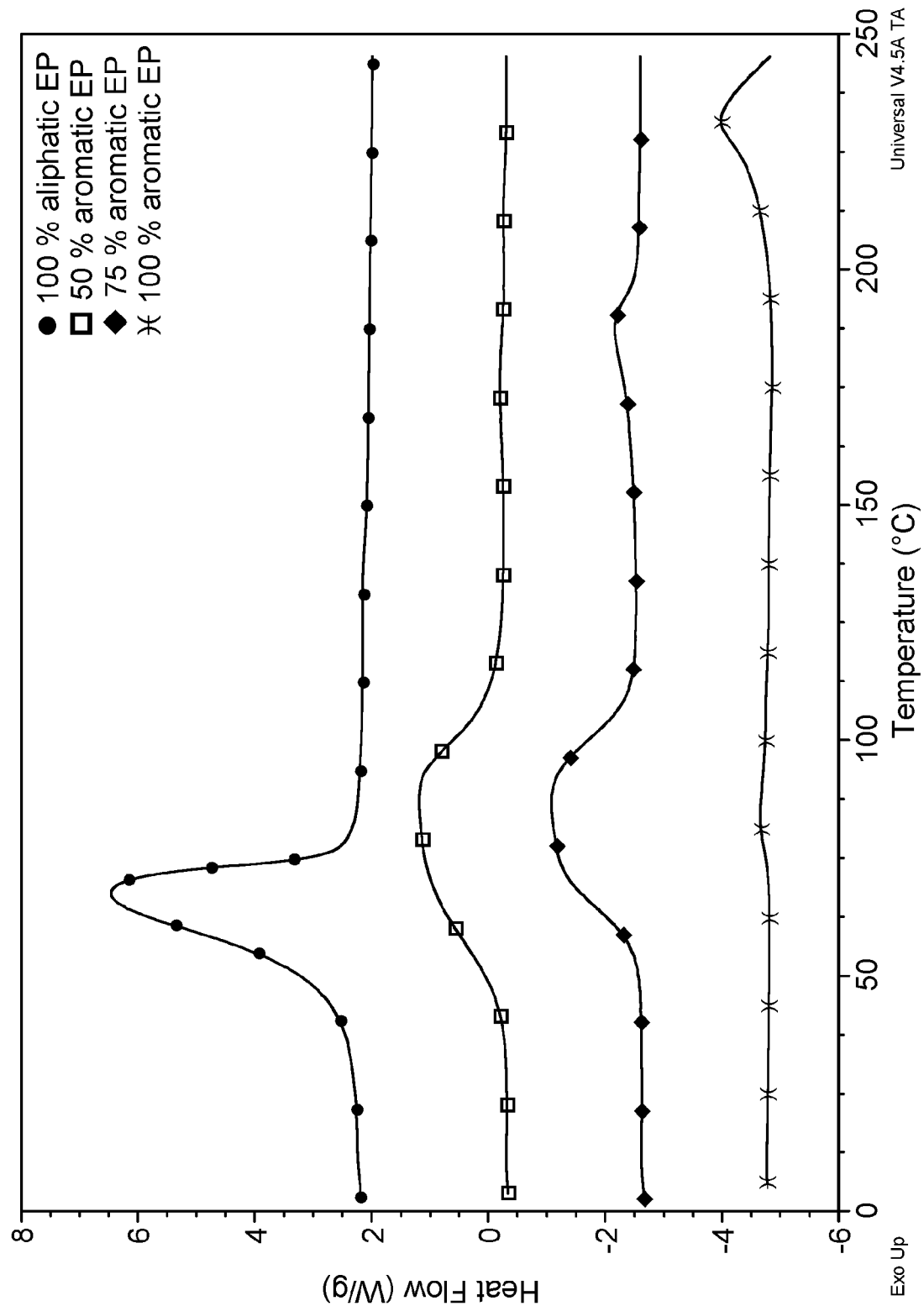
Figure 3:
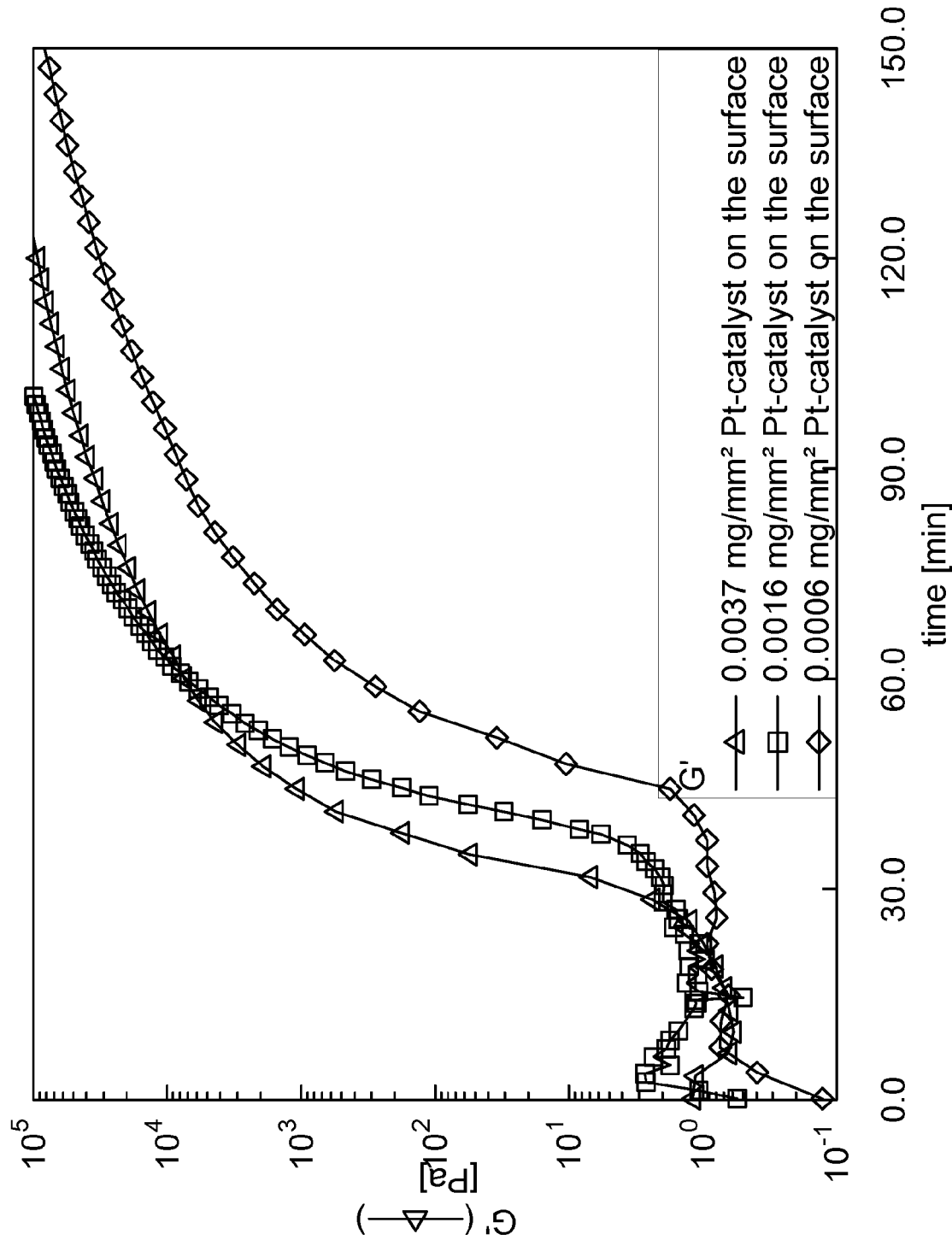

Lap shear tests were conducted according to DIN EN 1465 at room temperature. The expression 'lap shear strength' is synonymous with the expression 'half lap bond strength'.

Substrates: 1 mm thick Aluminium 2024 panel.

Lap shear strengths were measured using an Instron 5967 Instrument.

Lap shear strengths were prepared using coupons either cut from aluminium QUV Test panels (150 mm×100 mm) as supplied by Q-Panel or using coupons pre-cut to the correct length, usually 100 mm×25 mm in size.

Where appropriate, the panels/coupons were either coated with the adhesive component composition or powder coated with a powder coat catalyst component composition prior to testing or left uncoated (i.e. the adhesive component composition was applied directly to the catalyst component composition).

Types of Joints Prepared:
1) Powder coated coupon to Powder coated coupon, with adhesive component applied between the two coupons to one of the powder coated coupons, or
2) Powder coated coupon to blank coupon, with adhesive component applied between the two coupons to either the powder coated coupon or the blank coupon.

The powder coatings were prepared by adding the desired amount of catalyst to the premix of the powder coating (EPDXYPOL BT ULTRA, 30686, by Valspar), high speed mixing the dry mix, compounding in a twin screw extruder and grinding on an air classifying mill, followed by post sieving.

Test Parameters:
Bond Area: 25 mm×12.5 mm
Preload: 10N
Rate of Extension: 10.0 mm/min
End of Test Criteria: 5.0 mm The testing of different resin mixtures after 3 h and after 24 hours curing at room temperature is shown in Table 1 below.

TABLE 1

| parts of aliphatic glycidyl epoxy | parts of Bisphenol-A-epichlorhydrin resin | Lap shear strength [MPa] | |
|---|---|---|---|
| | | after 3 hours room temperature | after 24 h room temperature |
| 100 | 0 | — | 1.3 |
| 100 | 100 | 4.5 | 7.2 |
| 50 | 150 | 1.5 | 7.8 |
| 0 | 100 | did not cure | did not cure |

The adhesive composition was prepared by mixing the aliphatic glycidyl epoxy (1,6-hexandiol-diglycidether) with the Bisphenol-A-epichlorhydrin in their respective amounts, along with at least an initiator (OPPI) and a silane (diphenylmethylsilane). The catalyst was contained in a catalyst component composition comprising Pt (II) Cl$_2$ (cod) catalyst and a thermosetting epoxy polyester resin (EPDXYPOL BT ULTRA, 30686, by Valspar). The results show that mixtures of aliphatic glycidyl epoxy with Bisphenol-A-epichlorhydrin resin increases the lap shear strength. Lap shear strengths of 7-8 N/mm$^2$ were achieved

Example 2—Adhesive Mixtures

A number of different adhesive component mixtures were prepared, as set out in Table 2. These compositions also contained an initiator (OPPI) and a silane (diphenylmethylsilane), and a Pt catalyst (Pt (II) Cl$_2$ (cod)) was added to activate the polymerisation/curing process.

TABLE 2

| | 1,6-Hexandiol-diglycidether | Bisphenol-A-epichlrohydrin resin | aliphatic glycidether |
|---|---|---|---|
| A | 1000 parts | 1000 parts | — |
| B | 500 parts | 1000 parts | 500 parts Glycerintriglycidether |
| C | 500 parts | 1000 parts | 500 parts Pentaerythriolpolyglycidether |
| D | 500 parts | 1000 parts | 500 parts Trimethylolpropanetriglycidether |

Figure 4:
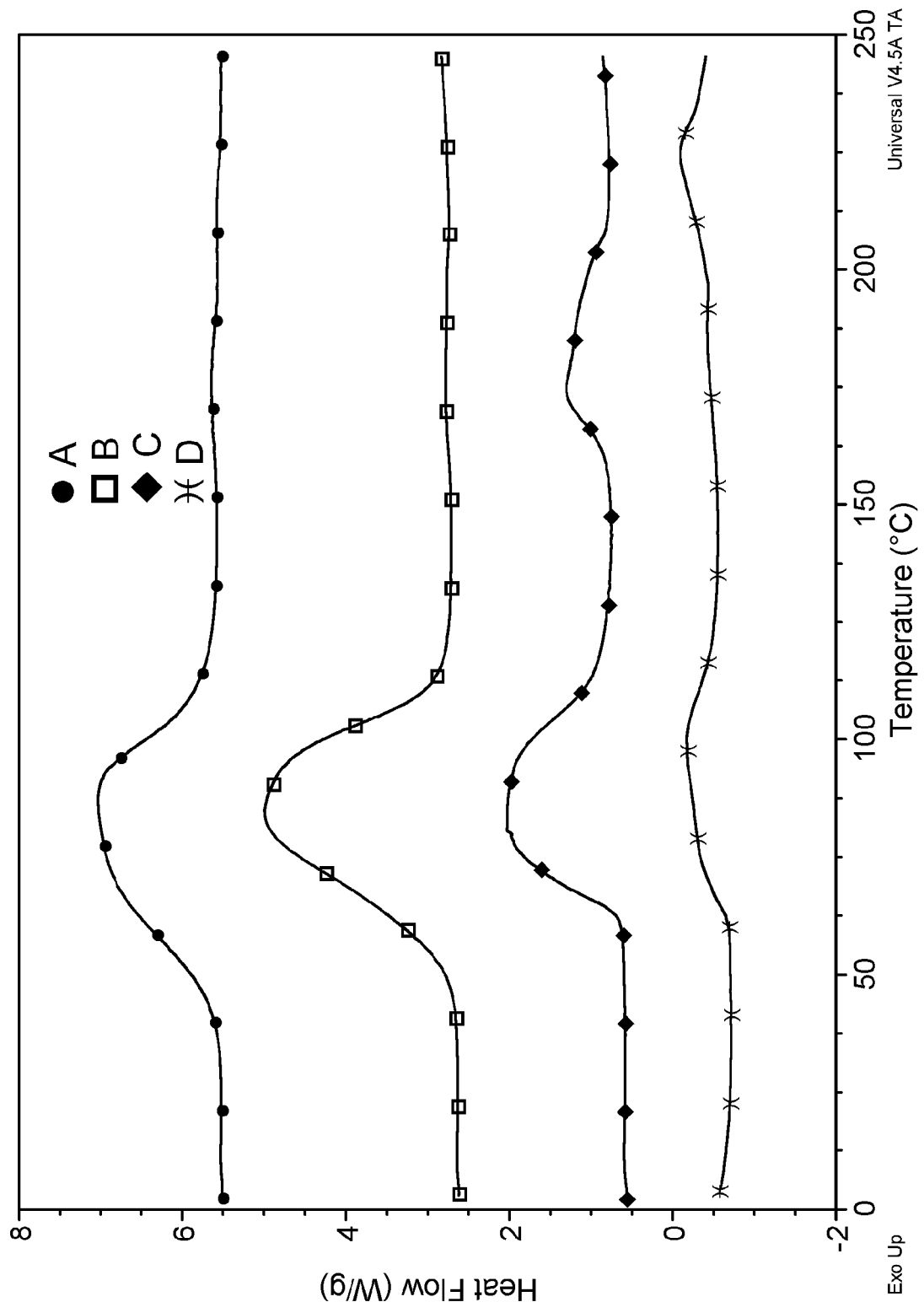
Figure 5:
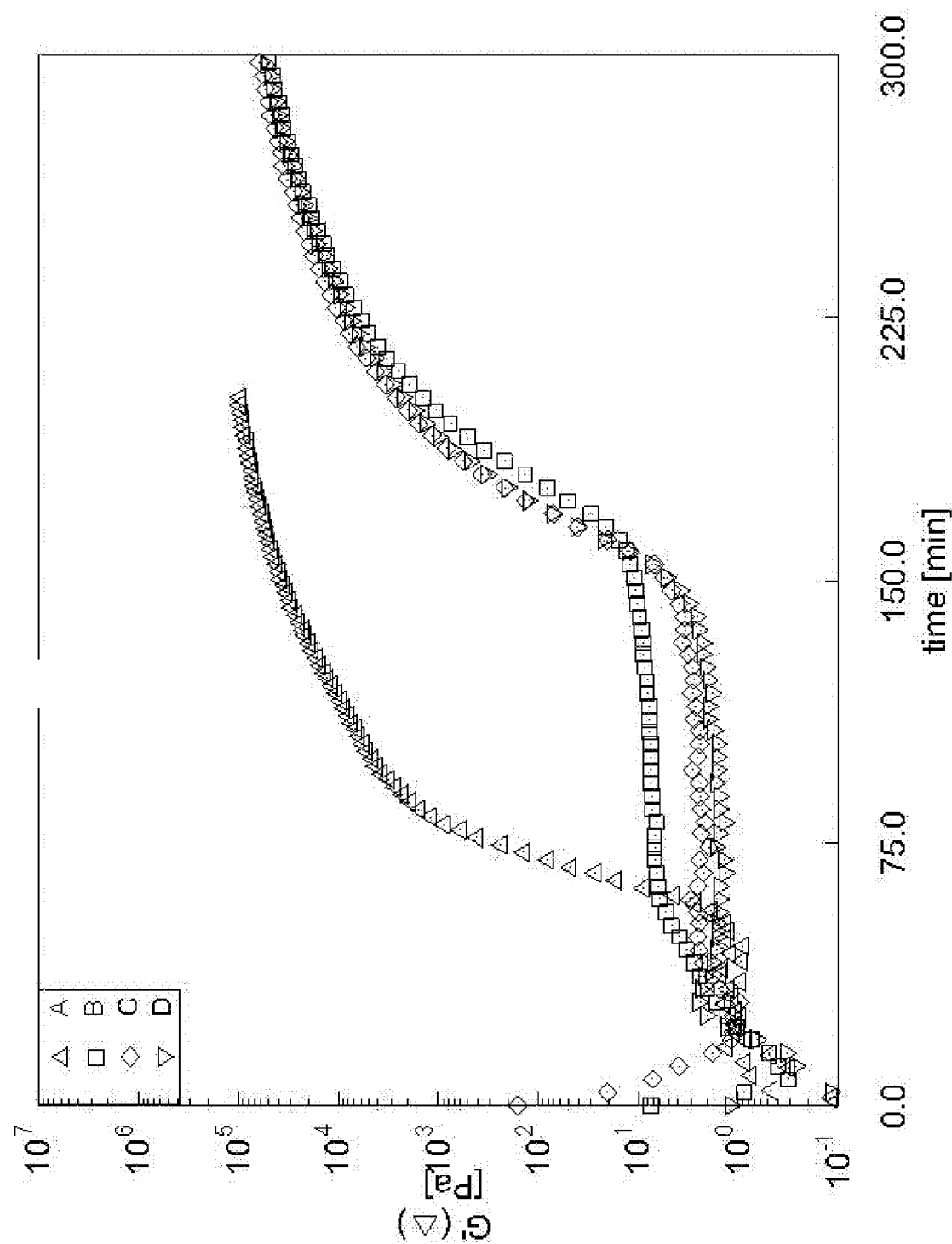

DSC measurements are shown in FIG. 4 and cure rates are shown in FIG. 5. Each formulation has an optimum reactivity at below 100° C. for curing, and provide comparable bonding, but formulations comprising an aliphatic glycidyl ether (i.e. 1.6-hexane diglycidyl ether), a further aliphatic glycidyl ether, and an aromatic glycidyl ether (i.e. bisphenol-A-epichlorohydrin resin) take slightly longer to achieve the same results.

Example 3—Substrates

Substrates which have been successfully bonded with the two-component adhesive composition of the invention include:
Aluminium: NG5754, A46, AL46, and AR14.
Steel: S275.
Magnesium: AZ31.
Plastics: PA6, PA6/ABS, and PP (the substrate surface was first functionalised using either a flame or corona treatment, and every test showed failure of the polypropylene material before the bond strength could be determined, i.e. the bond was stronger than the substrate material).
Composites: Carbon fibre composite.
Where magnesium substrates were employed, it was found that the magnesium could lead to poisoning of the catalyst. Thus, a coating on the magnesium surface may be required to prevent this from occurring. Surprisingly, it was found that a coating of the catalyst component composition (e.g. powder coat) of the invention, particularly at a thickness of 40 to 80 μm, prevented the catalyst from being poisoned.

Example 4—T-Peel Tests

T-Peel Strengths were measured using the Zwick Universal Testing System.

| Device | UTS from Zwick |
|---|---|
| Serial number | 801240/99 |
| temperature | room temperature |
| rate | 100 mm/min |

Powder coated panels of catalyst component (comprising Pt (II) Cl$_2$ (cod) catalyst (0.3% by weight, 52 wt % platinum) and a thermosetting epoxy polyester resin) were prepared and cured at various temperatures: 100° C., 120° C., 140° C., 160° C. and 180° C. for both textured (NW36/2) and smooth (NW35/2) surfaces (this cured the powder coating to the panel and allowed it to be stored for subsequent use with the adhesive). The adhesive (composition shown below) was pre-cured at room temperature for 24 hours, and then the adhesive and powder coated catalyst were cured at 70° C. for 1 hour. Similar results can also be obtained without pre-curing of the adhesive.

The adhesive component composition (liquid composition) was as follows:

| | |
|---|---|
| ADEKA resin ED 503 (1,6-hexanediol diglycidyl ether) | 1000 parts |
| Epikote resin 862 (BFDGE; based on bisphenol-F) | 1000 parts |
| OPPI hexafluoroantimonate | 10 parts |
| Diphenylmethylsilane | 34 parts |
| Deolink Epoxy TM-100 | 2 parts |
| Genioperl P52 | 360 parts |

The powder coatings were electro-statically applied to the earthed substrate using a Wagner hand gun with the following parameters and subsequently cured in an electric or gas oven.

| Powder Coat Settings | | |
|---|---|---|
| Program | P01 | P02 |
| Kv | 100 | 50 |
| μA | 80 | 20 |
| Cloud Volume, % | 50 | 40 |
| Oven Temp | 100-180° C. | 100-180° C. |
| Time | 30 mins. | 30 mins. |

Figure 6:
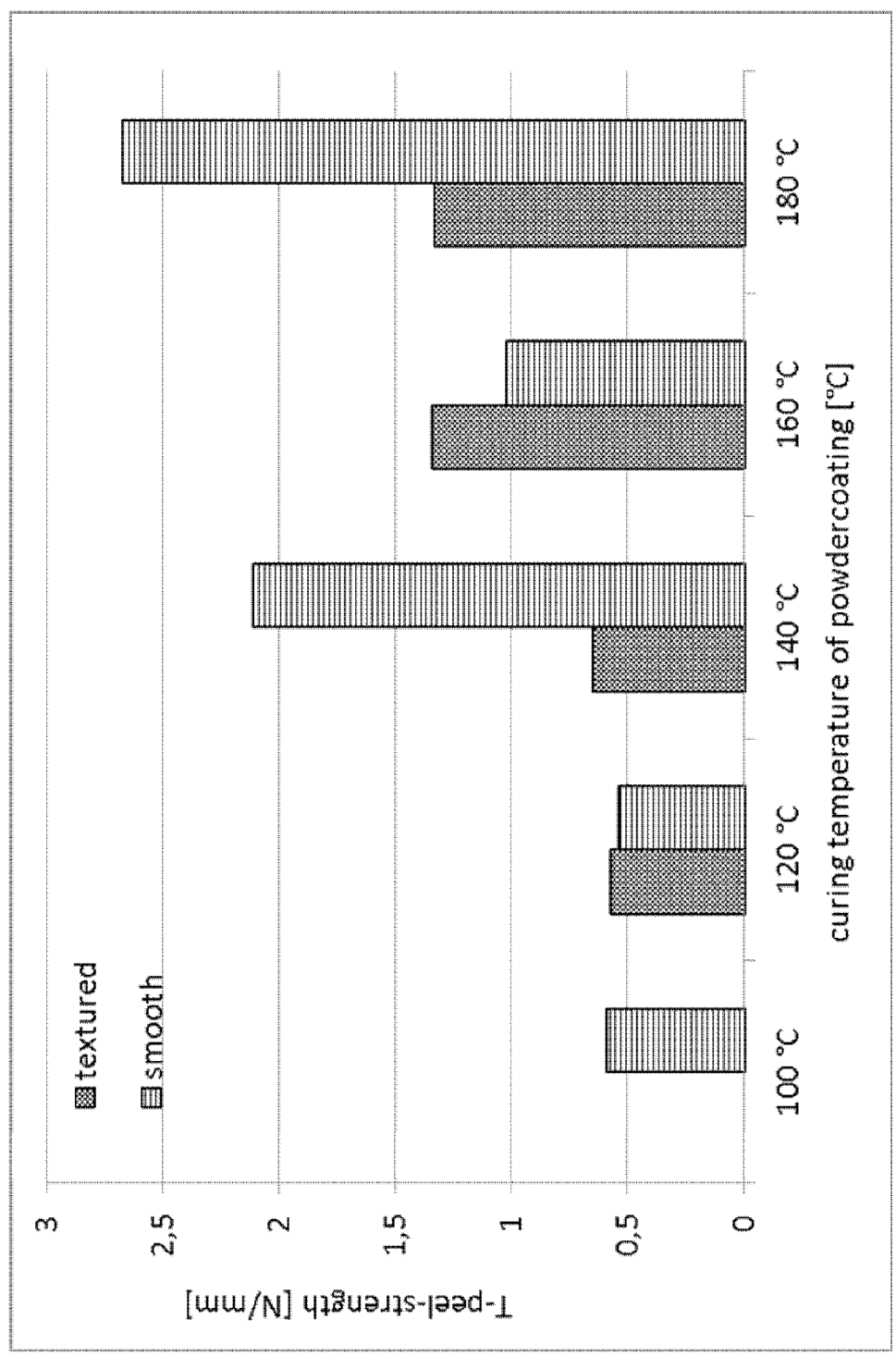

The results of the T peel test are shown in FIG. 6.

Example 5—Catalyst Studies

In order to evaluate the amount of platinum catalyst required to achieve the required fixture bond strength after 45 minutes, aluminium substrates were prepared with different amounts of platinum catalyst. These were tested by DSC measurements and by simple tests to determine the time to achieve a fixture bond. The adhesive component formulation was applied onto one aluminium substrate (i.e. without catalyst), and then a second substrate having a coating containing the platinum catalyst was placed on top. The results are shown in Table 3.

TABLE 3

| amount of Pt (II) Cl$_2$ (cod) catalyst/area | | observation after 45 minutes with adhesive (aliphatic/aromatic glycidyl ether) |
|---|---|---|
| mg/cm$^2$ | g/m$^2$ | |
| 0.03 | 0.31 | Fixture bond |
| 0.06 | 0.56 | Fixture bond |
| 0.09 | 0.85 | Fixture bond |
| 0.11 | 1.05 | Fixture bond |
| 0.13 | 1.34 | Fixture bond |
| 0.16 | 1.62 | Fixture bond |
| 0.19 | 1.94 | Fixture bond |
| 0.21 | 2.12 | Fixture bond |

It was found that the Pt (II) Cl$_2$ (cod) catalyst reacts very rapidly, and at lower concentrations of catalyst on the surface than for other catalysts. All samples tested achieved fixture bond for handling after 45 minutes. Also, an adhesive component composition containing both an aliphatic and aromatic glycidyl epoxy was found to react more rapidly than that with just an aliphatic glycidyl epoxy resin. It was also noted that a concentration of 0.3 g/m$^2$ is sufficient to achieve the required fixture bond strength after 45 minutes.

Example 6—Lap Shear Strengths Carbon Fibre Joints

Figure 7:
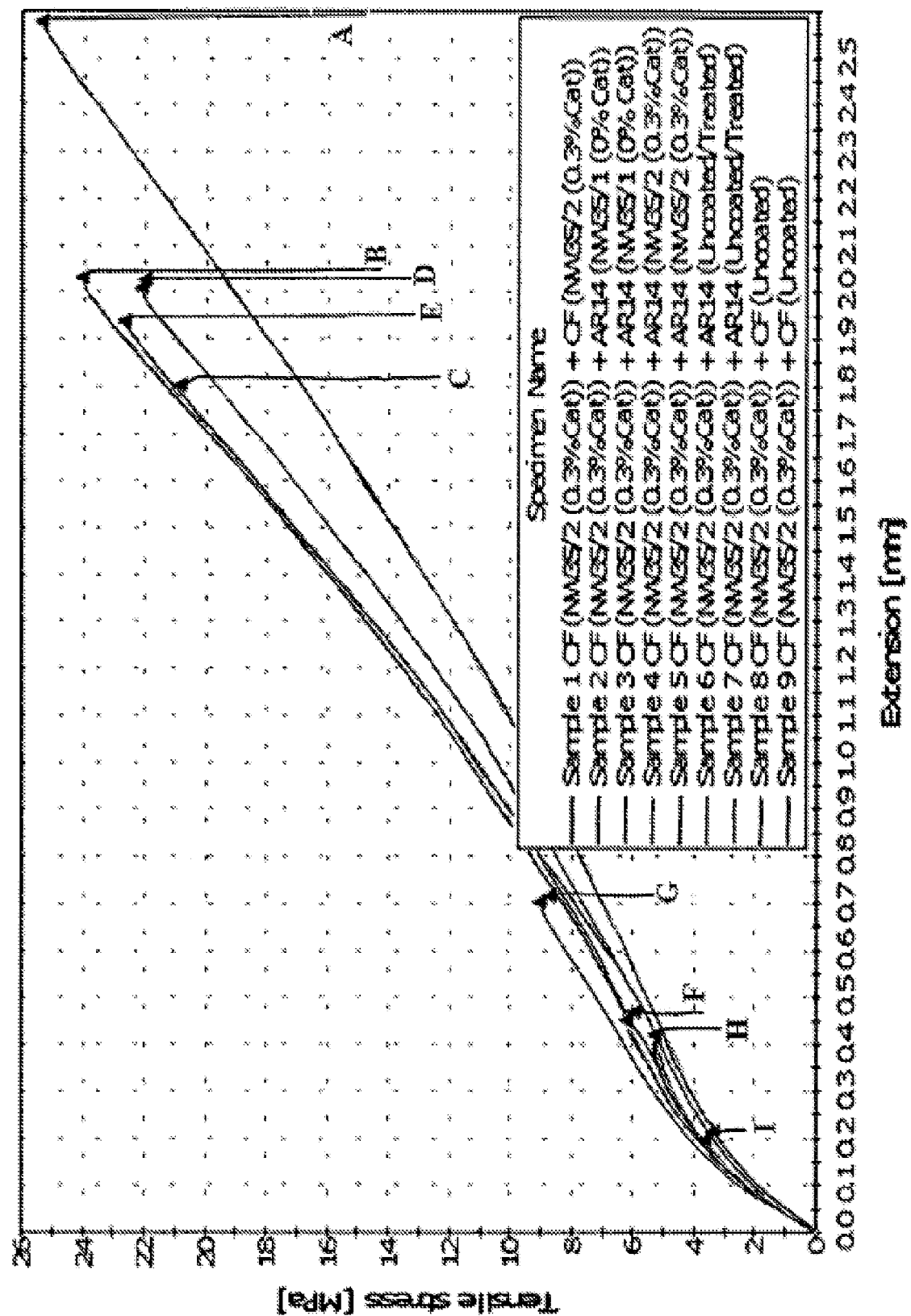
FIG. 7 shows the lap shear strengths of a number of carbon fibre (CF) panels, which have been powder coated with a catalyst component composition and cured with an adhesive component composition according to the invention to another panel of carbon fibre (CF) or aluminium (AR14). The results are also shown in Table 4, where samples 1-9 correspond with lines A-I, respectively.

Carbon fibre reinforced polymer (CFRP), smooth side (NW35/2) was applied with a powder coating of Pt (II) Cl$_2$ (cod) catalyst (0.3% by weight catalyst, 52 wt % platinum) and the powder coat cured for 20 minutes at 140° C. Lap shear joints were prepared, and then bonded with adhesive for 24 hrs ambient cure and 1 hr post cure at 70° C. The lap shear results are shown in Table 4 and FIG. 7. For 'uncoated' materials, the adhesive was applied on top of the powder coating immediately prior to bonding.

TABLE 4

| | Maximum Load [N] | Extension at Max Load [mm] | Load at Break [N] | Elong at Break [mm] | Stress at Break [N/mm$^2$] | Strain at Break [%] | Failure Mode |
|---|---|---|---|---|---|---|---|
| Sample 1 - CF (NW35/2(0.3%) + CF (NW35/2(0.3%)) | 8195.88 | 2.58 | 8195.88 | 2.57755 | 25.41 | 25775.46 | 50% Adhesive, 50% Cohesive |
| Sample 2 - CF (NW35/2(0.3%) + AR14 (NW35/1(0%)) | 7763.25 | 2.03 | 7763.25 | 2.03254 | 24.07 | 20325.38 | 50% Adhesive, 50% Cohesive |
| Sample 3 - CF (NW35/2(0.3%) + AR14 (NW35/1(0%)) | 6728.18 | 1.80 | 6728.18 | 1.80457 | 20.86 | 18045.69 | 50% Adhesive, 50% Cohesive |

TABLE 4-continued

|  | Maximum Load [N] | Extension at Max Load [mm] | Load at Break [N] | Elong at Break [mm] | Stress at Break [N/mm$^2$] | Strain at Break [%] | Failure Mode |
|---|---|---|---|---|---|---|---|
| Sample 4 - CF (NW35/2(0.3%) + AR14 (NW35/2(0.3%)) | 7145.15 | 2.01 | 7093.23 | 2.02670 | 21.99 | 20266.99 | 50% Adhesive, 50% Cohesive |
| Sample 5 - CF (NW35/2(0.3%) + AR14 (NW35/2(0.3%)) | 7312.68 | 1.94 | 7312.68 | 1.93807 | 22.67 | 19380.73 | 50% Adhesive, 50% Cohesive |
| Sample 6 - CF (NW35/2(0.3%) + AR14 (Uncoated, Treated)) | 2006.00 | 0.45 | 1916.36 | 0.46953 | 5.94 | 4695.28 | 50% Adhesive, 50% Cohesive |
| Sample 7 - CF (NW35/2(0.3%) + AR14 (Uncoated, Treated)) | 2926.73 | 0.70 | 2816.77 | 0.71881 | 8.73 | 7188.12 | 50% Adhesive, 50% Cohesive |
| Sample 8 - CF (NW35/2(0.3%) + CF (Uncoated) | 1701.63 | 0.42 | 1701.63 | 0.42413 | 5.28 | 4241.25 | 70% Adhesive, 30% Cohesive |
| Sample 9 - CF (NW35/2(0.3%) + CF (Uncoated) | 1179.47 | 0.20 | 1094.69 | 0.21486 | 3.39 | 2148.60 | 40% Adhesive, 60% Cohesive |

In samples 1, 3 and 4, the carbon fibre panel was cured to a second carbon fibre panel, where both were powder coated with the catalyst composition and the adhesive was applied to one of the panels before curing. In samples 2 and 3, the aluminium panel was coated with the powder coating, but no catalyst was present therein. In samples 6 to 9, the aluminium or carbon fibre second panel was uncoated.

Example 7—Lap Shear Strengths for Steel Joints

Figure 8:
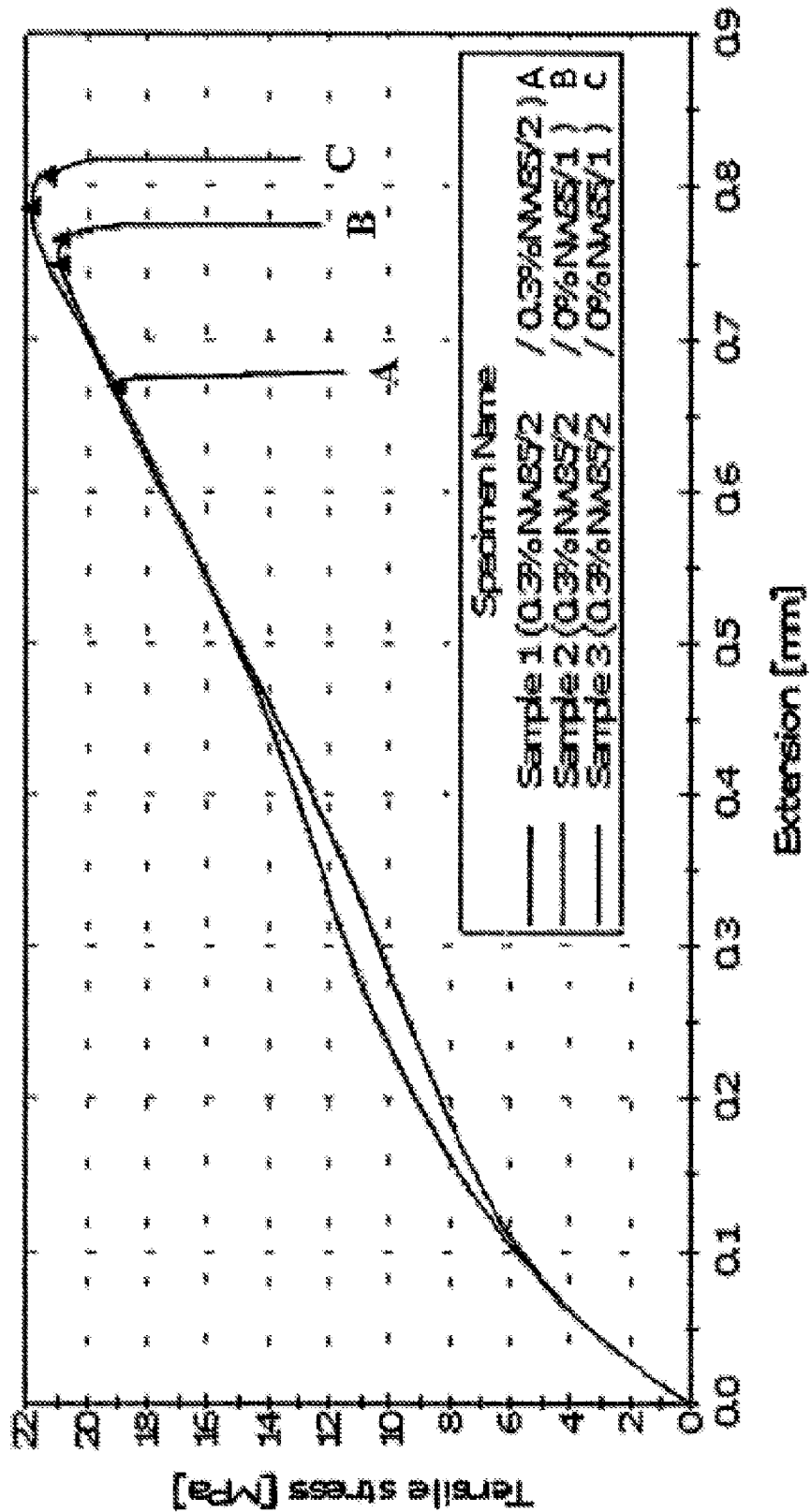
FIG. 8 shows the lap shear strengths of steel panels, which have been powder coated with a catalyst component composition and cured with an adhesive component composition according to the invention to another panel of steel.

Steel (S275, NW35/2) was applied with a powder coating of Pt (II) Cl$_2$ (cod) catalyst (0.3% by weight catalyst, 52 wt % platinum) and the powder coat cured for 15 minutes at 140° C. Lap shear joints were prepared, and then bonded with adhesive for 24 hrs ambient cure and 1 hr post cure at 70° C. The lap shear results are shown in Table 5 and FIG. 8.

TABLE 5

|  | Maximum Load [N] | Extension at Max Load [mm] | Load at Break [N] | Elong at Break [mm] | Stress at Break [N/mm$^2$] | Strain at Break [%] | Failure Mode |
|---|---|---|---|---|---|---|---|
| 1 | 6152.41 | 0.67 | 6152.41 | 0.66865 | 19.07 | 6686.48 | Cohesive |
| 2 | 6761.97 | 0.75 | 6741.52 | 0.76449 | 20.90 | 7644.93 | Cohesive |
| 3 | 7063.87 | 0.79 | 6910.71 | 0.80621 | 21.42 | 8062.12 | Cohesive |

In sample 1, the steel panel was cured to a second steel panel, where both were powder coated with the catalyst composition and the adhesive was applied to one of the panels before curing. In samples 2 and 3, the second steel panel was coated with the powder coating, but no catalyst was present therein.

Example 8—Viscosity Modification

Viscosity modification was tested as a means to improve the viscosity characteristics of the adhesive component composition of Example 4. In particular, Aerosil particles (fumed silica) were added into the adhesive component composition in order to determine whether a composition could be obtained which does not flow on a substrate placed in a vertical orientation.

Adhesive component compositions were obtained by adding Aerosil R8200 or 104 particles into the composition of Example 4 at a level of 4.4 wt % or 5.7 wt % of the composition. The resulting viscosities were then measured at two different shear rates at 23° C. Some of the results are presented in Table 6 below.

TABLE 6

| Adhesive Component Composition of Example 4 | Viscosity at 0.1 1/s [Pas] | Viscosity at 150 1/s [Pas] |
|---|---|---|
| +4.4 wt % Aerosil R8200 | 143 | 1.5 |
| +5.7 wt % Aerosil R8200 | 269 | 3.1 |

The results showed that adding between 4.4 wt % and 5.7 wt % Aerosil particles provided a composition with suitable wetting properties, but which did not flow on the substrate when it was placed in a vertical orientation, thereby improving the viscosity profile of the composition and allowing it to be used in a number of different applications.

Example 9—Catalyst Film

Equipment

Cast film line consisting of a single screw extruder, a Dr. Collin Slot Die Machine type 250 mm, and a Dr. Collin Chill Roll Machine type 136/350.

Method

Preparation of the Catalyst Film

The ingredients were volumetrically weighed and hand shaken in a polyethylene bag. The compositions of three catalyst films are shown in Table 7 in terms of the relative proportions (%) of each component.

A measuring jug was used to dose the correct volume of pellet into the bag. For NWPT4/5, 250 ml of Dowlex, 250 ml Amplify and 5 g of catalyst was shaken in the bag.

TABLE 7

| Material | NWPT4/1 | NWPT4/4 | NWPT4/5 |
|---|---|---|---|
| Dowlex 2107 GC | 100 | 50 | 49 |
| Amplify GR204 | 0 | 50 | 50 |
| Pt catalyst** | 0 | 0 | 1.0 |

Dowlex 2107 GC LLDPE (linear low density polyethylene) MFI (melt flow index) 2.3 g/10 min
Amplify GR204 >1% MAH (maleic anhydride) grafted HDPE (high density polyethylene) MFI 12 g/10 min
**Strem Chemicals product number 78-0430, Dichloro(1,5-cyclooctadiene)platinum II
The catalyst was employed in an excess in these tests in order to be certain that enough catalyst was present to initiate curing; less catalyst is actually required to achieve curing.

The line was then started using NWPT4/1 material to produce an approximately 50 μm film. Once the film had stabilised, NWPT4/4 (no catalyst) was added to the hopper and the line re-stabilised. NWPT4/5 was then added to the hopper, the line stabilised and the film collected.

The line was set up to produce a self-supporting sheet of NWPT4/1. Once stable, NWPT4/5 film was fed onto the molten film to laminate the two films together. Pressure was applied using the nip roller on the chill roll. This produced a film with a catalysed surface on one side only.

NWPT4/1 ran very well at 290/210/210/200 extruder, die all zones 200° C., 60 rpm, 20% torque.

To add functionality to aid wetting of the adhesive, NWPT4/4 contained Amplify GR204. A good film was produced.

Catalyst was added to make NWPT4/5. The line was run as with NWPT4/4 and a good film produced with 50 μm thickness. NWPT4/5 film ran sufficiently well, but was improved by reducing the line speed in order to prevent breakage of the film. No significant change in extruder torque was noted between NWPT4/4 and NWPT4/5.

To test the catalytic activity of the film, the film was cut into small strips and fastened to Al LSS bars with clips, as discussed below. The adhesive thickness was controlled by making a K bar out of a spreading knife with calibrated thickness wire wrapped around the edge.

Verification of Catalyst Surface Activation

Three separate AC600 Type 6000 aluminium alloy sheets were prepared, two with a Powderbond powder coating (as described in Example 1) and one without, and were coated in a 100 μm film of the adhesive component composition of Example 4. The compositions were then cured in a gas oven at 100° C. for 45 minutes.

Rubbing a blade over the adhesive surface showed that the adhesive had hardened on the samples coated in the Powderbond powder coating (containing catalyst) but was still liquid on the sample that was not uncoated (i.e. did not have any catalyst to initiate adhesive cure). This was a control test to verify the quality of the adhesive being used in the study.

Three separate AC600 Type 6000 aluminium alloy sheets were prepared by clipping the following films to the surface: NWPT4/1 (no catalyst), NWPT4/4 (no catalyst), and NWPT4/5 (catalyst). Each substrate was coated in a 100 μm film of the adhesive component composition of Example 4. The compositions were then cured in a gas oven at 100° C. for 45 minutes.

The cure of the adhesive was checked by running a blade across the surface to verify the material state. The adhesive was liquid on films NWPT4/1 and NWPT4/4, but had changed to a hard solid on film NWPT4/5. A colour change and shrinkage of film sample NWPT4/5 could be seen as the adhesive cured during the baking cycle.

To test the bonding of two separate substrates, cross bars of AC600 Type 6000 aluminium alloy sheets were prepared: (i) AC600 Powderbond powder coated aluminium (as described in Example 1, i.e. containing catalyst), (ii) NWPT4/4 film (no catalyst), and (iii) NWPT4/5 film (containing catalyst). A 200 μm layer of the adhesive component composition of Example 4 was applied at each intersection where the cross bars meet.

After cooling, hand pressure was applied to the joint to try to break the bond. The AC600 Powderbond powder coated sample and the NWPT4/5 film could not be easily pulled apart. The sample containing NWPT4/4 came apart with light pressure and the adhesive was seen to be in a liquid state.

In another bonding test, NWPT4/4 film and NWPT4/5 film, which were each attached to AC600 Type 6000 aluminium alloy panels, were covered with a 200 um layer of the adhesive component composition of Example 4. The thickness was controlled using spacer wires. Following curing, the adhesive in contact with the NWPT4/4 film remained in a liquid state with no adhesion to either surface; the panels were easily separated. The panels containing the NWPT4/5 film were well bonded and had to be prised apart with a screwdriver. The film was very well bonded to the adhesive, which in turn was strongly bound to the aluminium panel.

Table 8 shows the activity of the catalyst from the catalysed surface. Surface 1 and surface 2 describe the surfaces in contact with the adhesive.

TABLE 8

| Surface 1 | Surface 2 | Result |
|---|---|---|
| NWPT4/1 | None | Adhesive remained liquid, no cure |
| NWPT4/4 | None | Adhesive remained liquid, no cure |
| NWPT4/5 | None | Adhesive became solid, cured |
| AC600 Powderbond coated sheet | None | Adhesive became solid, cured |
| NWPT4/5 | NWPT4/5 | Adhesive became solid, cured |
| NWPT4/4 | NWPT4/4 | Adhesive remained liquid, no cure |
| AC600 Powderbond coated sheet | AC600 Powderbond coated sheet | Adhesive became solid, cured |
| NWPT4/4 | Aluminium | Adhesive remained liquid, no cure |
| NWPT4/5 | Aluminium | Adhesive became solid, cured |

Accordingly, the catalyst was successfully incorporated into a polyethylene film and processed using standard cast film equipment. The catalyst remained active following processing and cured the adhesive component composition of Example 4 on contact. Good bonds were achieved against aluminium substrates and the film using the adhesive. The adhesive was shown not to cure when the catalyst was absent. A bilayer film was produced with good adhesion between the bonding film and the LLDPE.

The invention claimed is:

1. A contact curable adhesive composition, wherein the composition is a physically separated two-component composition that cures upon contact of the two components, the composition comprising:
   (A) an adhesive component comprising:
      (i) an aliphatic glycidyl ether;
      (ii) an aromatic glycidyl ether and optionally a cycloaliphatic epoxy; and
      (iii) a silane reducing agent; and
   (B) a catalyst component comprising:
      (iv) a Group 9 or Group 10 noble metal catalyst,
   wherein the adhesive component (A) and/or the catalyst component (B) further comprises an initiator.

2. The contact curable adhesive composition according to claim 1, wherein the aliphatic glycidyl ether is an aliphatic di- or tri-glycidyl ether.

3. The contact curable adhesive composition according to claim 1, wherein the cycloaliphatic epoxy is a dicycloalkyl epoxy.

4. The contact curable adhesive composition according to claim 1, wherein the aromatic glycidyl ether is an aromatic di- or tri-glycidyl ether.

5. The contact curable adhesive composition according to claim 1, wherein the initiator is an iodonium salt selected from (4-n-octyloxyphenyl)phenyliodonium hexafluoroantimonate (OPPI SbF$_6$), (4-n-decyloxyphenyl)phenyliodonium hexafluorophosphate (DOPI PF$_6$), di(t-butylphenyl)iodonium hexafluoroarsenate (DTBPI AsF$_6$), and (4-methylphenyl)-(4-isopropylphenyl)iodonium tetrakis pentafluorophenylborate (Rhodorsil 2074).

6. The contact curable adhesive composition according to claim 1, wherein the silane reducing agent is of the formula (Ar)$_2$RSiH, wherein Ar is an optionally substituted 6-10-membered aryl or heteroaryl group, and R is an optionally substituted C$_{1-6}$ alkyl group.

7. The contact curable adhesive composition according to claim 6, wherein Ar is an optionally substituted phenyl group.

8. The contact curable adhesive composition according to claim 6, wherein R is an optionally substituted methyl group.

9. The contact curable adhesive composition according to claim 1, wherein the Group 9 or Group 10 noble metal catalyst is a platinum or palladium catalyst.

10. The contact curable adhesive composition according to claim 1, wherein the Group 9 or Group 10 noble metal catalyst has an oxidation state of 0 or 2.

11. The contact curable adhesive composition according to claim 1, wherein the Group 9 or Group 10 noble metal catalyst is of the formula M(II)(X)$_2$(Y), wherein M is a metal selected from palladium and platinum, (II) represents the oxidation state of M, X is a monovalent ligand selected from halide, water, hydroxyl, cyanide, carbon monoxide, and ammonia, and Y is a bidentate ligand selected from a C$_{1-6}$ alkylenediamine group, a C$_{1-6}$ alkyl 1,3-dicarbonyl anion, a 1,2-dicarbonyl anion, a phenanthroline group, a bipyridyl group, and a cycloalkadienyl group.

12. The contact curable adhesive composition according to claim 11, wherein X is halide.

13. The contact curable adhesive composition according to claim 11, wherein Y is a cycloalkadienyl group.

14. The contact curable adhesive composition according to claim 1, wherein the catalyst component (B) further comprises a carrier selected from a solvent-based paint composition, a water-based paint composition, a VOC-free paint composition, a powder coat composition, an electro-coating composition, a polymeric film, a fibre-based film or resin, a thermoplastic polymer composition, and a thermosetting polymer composition, and the catalyst is provided at an outer surface of the carrier.

15. A method of curing a contact curable adhesive composition, wherein the composition is a physically separated two-component composition that cures upon contact of the two components, the method comprising:
bringing an adhesive component (A) into contact with a catalyst component (B),
wherein the adhesive component (A) comprises:
(i) an aliphatic glycidyl ether;
(ii) an aromatic glycidyl ether and optionally a cycloaliphatic epoxy; and
(iii) a silane reducing agent;
wherein the catalyst component (B) comprises:
(iv) a Group 9 or Group 10 noble metal catalyst; and
wherein the adhesive component (A) and/or the catalyst component (B) further comprises an initiator.

16. The method according to claim 15, further comprising heating the contact curable adhesive composition at a temperature of up to 180° C.

17. The method according to claim 16, wherein the contact curable adhesive composition is heated for a period of time of up to 60 minutes.

18. A cured composition obtained by the method of claim 15.

* * * * *